US010602006B2

(12) United States Patent
Yamamoto et al.

(10) Patent No.: US 10,602,006 B2
(45) Date of Patent: Mar. 24, 2020

(54) OPERATION TERMINAL AND IMAGE PROCESSING DEVICE DETACHABLY HOLDING THE SAME

(71) Applicant: Konica Minolta, Inc., Chiyoda-ku, Tokyo (JP)

(72) Inventors: Mineo Yamamoto, Toyokawa (JP); Isao Watanabe, Toyohashi (JP); Toshikazu Higashi, Toyokawa (JP); Hiroshi Yamaguchi, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 158 days.

(21) Appl. No.: 15/403,776

(22) Filed: Jan. 11, 2017

(65) Prior Publication Data
US 2017/0208195 A1    Jul. 20, 2017

(30) Foreign Application Priority Data
Jan. 20, 2016    (JP) ................................ 2016-008713

(51) Int. Cl.
*H04N 1/00*    (2006.01)
*G06F 1/16*    (2006.01)
(Continued)

(52) U.S. Cl.
CPC ....... *H04N 1/00496* (2013.01); *G06F 1/1626* (2013.01); *G06F 1/1632* (2013.01);
(Continued)

(58) Field of Classification Search
None
See application file for complete search history.

(56) References Cited

U.S. PATENT DOCUMENTS

2004/0184108 A1* 9/2004 Takano .............. H04N 1/00413
358/400
2012/0105378 A1* 5/2012 Ogishima ............. G06F 1/3262
345/175

FOREIGN PATENT DOCUMENTS

JP    2006-150865 A    6/2006
JP    2010-282346 A    12/2010
(Continued)

OTHER PUBLICATIONS

English language translation of Shimpei et al., JP 2015-143779, cited in the IDS , Aug. 6, 2015.*
(Continued)

*Primary Examiner* — Benny Q Tieu
*Assistant Examiner* — Pawan Dhingra
(74) *Attorney, Agent, or Firm* — Buchanan Ingersoll & Rooney PC

(57) ABSTRACT

An operation terminal is held by and detachable from a holder on an MFP. The operation terminal includes a touch panel with a display region for an operation screen for the MFP. The touch panel senses an external object touching the display region. A vibrator unit applies vibration to the display region. In response to the touch panel sensing the object, a response controller unit instructs the vibrator unit to apply to the display region vibration responsive to the object. The response controller unit checks whether the operation terminal is held by or detached from the holder at the time the touch panel senses the object, and when the operation terminal is held by the holder, sets the responsive vibration to a level lower than when the operation terminal is detached from the holder.

19 Claims, 12 Drawing Sheets

(51) Int. Cl.
*G06F 3/01* (2006.01)
*H04N 1/04* (2006.01)

(52) U.S. Cl.
CPC ......... *G06F 1/1637* (2013.01); *G06F 1/1643* (2013.01); *G06F 1/1684* (2013.01); *G06F 3/016* (2013.01); *H04N 1/0057* (2013.01); *H04N 1/00411* (2013.01); *H04N 1/00488* (2013.01); *H04N 1/00493* (2013.01); *H04N 1/00538* (2013.01); *H04N 1/04* (2013.01); *H04N 2201/0094* (2013.01)

(56) References Cited

FOREIGN PATENT DOCUMENTS

| | | |
|---|---|---|
| JP | 2011-008532 A | 1/2011 |
| JP | 2013-205425 A | 10/2013 |
| JP | 2014-022769 A | 2/2014 |
| JP | 2015-143779 A | 8/2015 |

OTHER PUBLICATIONS

English language translation of Yukie, JP 2010-282346, cited in the IDS , Dec. 16, 2010.*
English language translation of Junji, JP 2006-150865, cited in the IDS , Jun. 15, 2006.*
Abstract: English language translation of Shimpei et al., JP 2015-143779, cited in the IDS , Aug. 6, 2015.*
Abstract: English language translation of Yukie, JP 2010-282346, cited in the IDS , Dec. 16, 2010.*
Abstract: English language translation of Junji, JP 2006-150865, cited in the IDS , Jun. 15, 2006.*

* cited by examiner

OPERATION TERMINAL AND IMAGE PROCESSING DEVICE DETACHABLY HOLDING THE SAME

This application is based on an application No. 2016-008713 filed in Japan, the contents of which are hereby incorporated by reference.

BACKGROUND OF THE INVENTION

1. Field of the Invention

The invention relates to an image processing device, in particular, a technology of enabling a touch panel implemented on an operation terminal detachably held by the device to respond to a touch that the touch panel senses.

2. Background

Touch panels have now become established as input devices essential for operation of electric appliances. Indeed, touch panels are included as standard equipment in automated teller machines (ATM) of banks, and in automatic ticket machines of stations. Touch panels are standard input devices of smartphones and tablet terminals, which have spread at an explosive pace. In recent years, home electric appliances also include many types with operation panels in which touch panels are implemented.

Such widespread use of touch panels is largely due to a good operational feeling that touch panels provide to users. With touch panels, users can directly touch and operate graphic user interface (GUI) components, such as icons and virtual buttons, displayed on operation screens. The GUI components are hereinafter referred to as "gadgets." Such easy-to-grasp operations enable the touch panels to provide users with a good operational feeling.

A known method of improving operational feeling is, for example, a technology of making a touch panel respond by light or sound to a touch that the touch panel senses. More concretely, the touch panel, when sensing the touch of a user's finger or the like, instructs the display device to change the appearance of gadgets such as their colors, shapes, and brightness, or the speaker to produce electronic sounds. Such visual or auditory response allows the user to perceive "reaction" to the touch on the touch panel, which is also called "click feeling" or "feedback," so that the user senses that his/her operation by the touch has been accepted by the device equipped with the touch panel.

In particular, a function of a touch panel responding to a touch by vibration is referred to as "force feedback (FFB)." See, for example, JP 2006-150865, JP 2010-282346, and JP 2011-008532. By such vibration, which is hereinafter referred to as "responsive vibration," the touch panel enables a user to feel as if the reaction to his/her touch on a virtual button were the tactile feedback from a pushed mechanical button. Since the responsive vibration is a tactile response, it can be sufficiently perceived by a user who is less able to sense change in appearance of gadgets or electronic sounds, such as a child and an elderly person.

Recently, a technology is being developed to incorporate an operation panel into a terminal portable and detachable from a device to be operated. See, for example, JP 2013-205425, JP 2014-022769, and JP 2015-143779. Such a terminal is hereinafter referred to as an "operation terminal." An operation terminal disclosed in JP 2013-205425 is equipped with hardware similar to one built in an existing mobile electronic device such as a smartphone or a tablet, and detachably held by a device to be operated. Operation terminals disclosed in JP 2014-022769 and JP 2015-143779 are realized by existing mobile electronic devices executing specific application programs. Each of the operation terminals allows a user to handle it as a familiar, existing mobile electronic device such as his/her own smartphone. This further improves operational feeling that the touch panel built in the operation panel provides to a user.

SUMMARY OF THE INVENTION

Use of touch panels is growing in image processing devices such as printers, copiers, scanners, and facsimile machines. Accordingly, application of operation terminals to the image processing devices should facilitate improvement in operational feeling, but this application has the following problems.

Operating noises of the image processing devices and ambient noises in offices et al. where the image processing devices are placed typically have high sound pressures and various tones. Thus, even when the operation terminal attached to the image processing device provides a sound responsive to a user's touch on the touch panel with the same attributes, e.g. a constant sound pressure, as the operation terminal detached from the image processing device, the user hardly hears the sound as having the same attributes. The user can hear a sound responsive to the same operation as being different depending on operation noises of the device and ambient noises, thus experiencing a feeling of strangeness, which can prevent improvement in operational feeling.

Operation of an image processing device is vulnerable to external vibration and shock. For example, if external vibration or shock received by a scanner displaces a document that the auto document feeder (ADF) is conveying, or a light source or image sensor element that is moving across the platen, the scanner captures a distorted image. If external vibration or shock received by an inkjet printer displaces the head during printing, the printer prints a distorted image. Thus, an excessively large level of responsive vibration that the touch panel generates when the operation terminal is held by an image processing device might degrade the reliability of the image processing device.

An object of the invention is to solve the above-mentioned problems, in particular, to provide an image processing device that enables a user to perceive a response of a touch panel of an operation terminal attached to the device in the same manner as the operation terminal detached from the device, without any adverse effect on its own operations.

An image processing device according to one aspect of the invention includes an image processing unit, an operation terminal, a control unit, a housing, and a discrimination unit. The image processing unit captures an image from a sheet and/or prints an image on a sheet. The operation terminal is portable, displays an operation screen for the image processing unit to accept a user operation on the operation screen, and wirelessly transmits information about the user operation. The control unit wirelessly receives the information about the user operation from the operation terminal, and controls the image processing unit according to the information. The housing supports the image processing unit and the control unit inside itself, and includes a holder that detachably holds the operation terminal. The discrimination unit discriminates between the presence and absence of the operation terminal held by the holder. The operation terminal includes a touch panel, a signal generator unit, and a response controller unit. The touch panel has a display region for the operation screen and senses an external object touching the display region. The signal generator unit generates a signal perceivable to a user. The response controller unit, in response to the touch panel sensing the object, instructs the signal generator unit to generate the signal responsive to the object in a form that varies depending on whether the operation terminal is held by or detached from the holder.

BRIEF DESCRIPTION OF THE DRAWINGS

These and other objects, advantages, and features of the invention will become apparent from the following description thereof taken in conjunction with the accompanying drawings which illustrate a specific embodiment of the invention. In the drawings.

DETAILED DESCRIPTION

The following is a description of embodiments of the invention with reference to the drawings.

Appearance of Image Processing System

Figure 1:
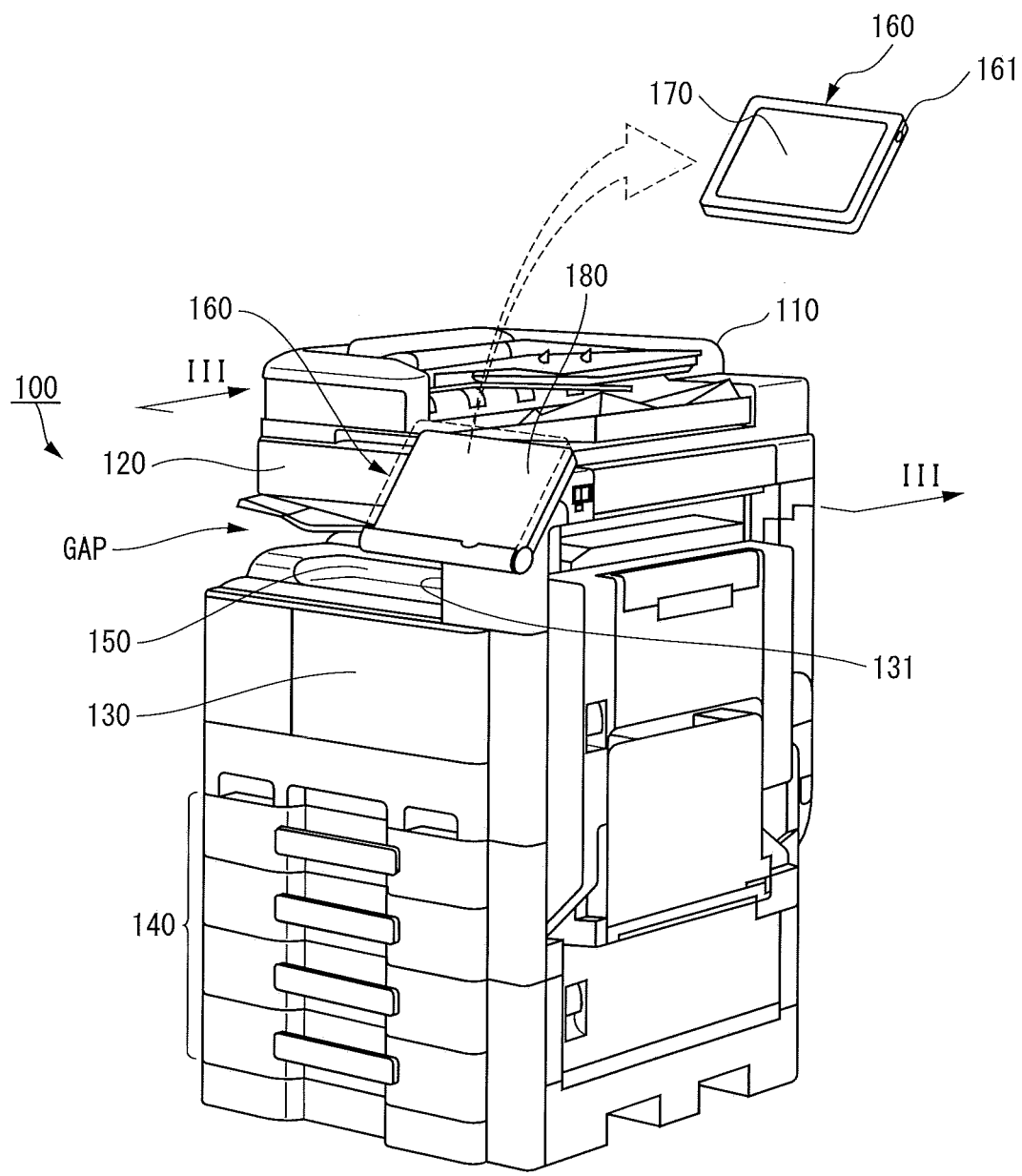
FIG. 1 is a perspective view of the appearance of an image processing device according to an embodiment of the invention.

FIG. 1 is a perspective view of the appearance of an image processing device according to an embodiment of the invention. The image processing device 100 is a multi-function peripheral (MFP) of the in-body paper ejection type, which combines image processing functions of a scanner, color copier, and color laser printer. Referring to FIG. 1, the MFP 100 has, on the top surface of its body, an auto document feeder (ADF) 110. In an upper portion of the body directly below the ADF 110, the MFP 100 houses a scanner 120, and in a lower portion of the body, it includes a printer 130 with a lower portion to which paper cassettes 140 are attached to be able to slide out like drawers. In a space GAP between the scanner 120 and the printer 130, the MFP 100 has an ejection tray 150, and next to it, an ejection slot 42, from which the MIT 100 ejects sheets to the ejection tray 150. On a front surface of the body located next to the space GAP, the MFP 100 has an operation terminal 160 and its holder 180. The operation terminal 160, which is a portable electronic device equipped with hardware similar to an existing mobile electronic device such as a smartphone or tablet, is detachably supported by the holder 180. The operation terminal 160 includes a touch panel 170 embedded in its front surface and surrounded by a variety of mechanical push buttons 161. Although FIG. 1 does not show, the holder 180 also has various operation switches such as push buttons.

Figure 2A:
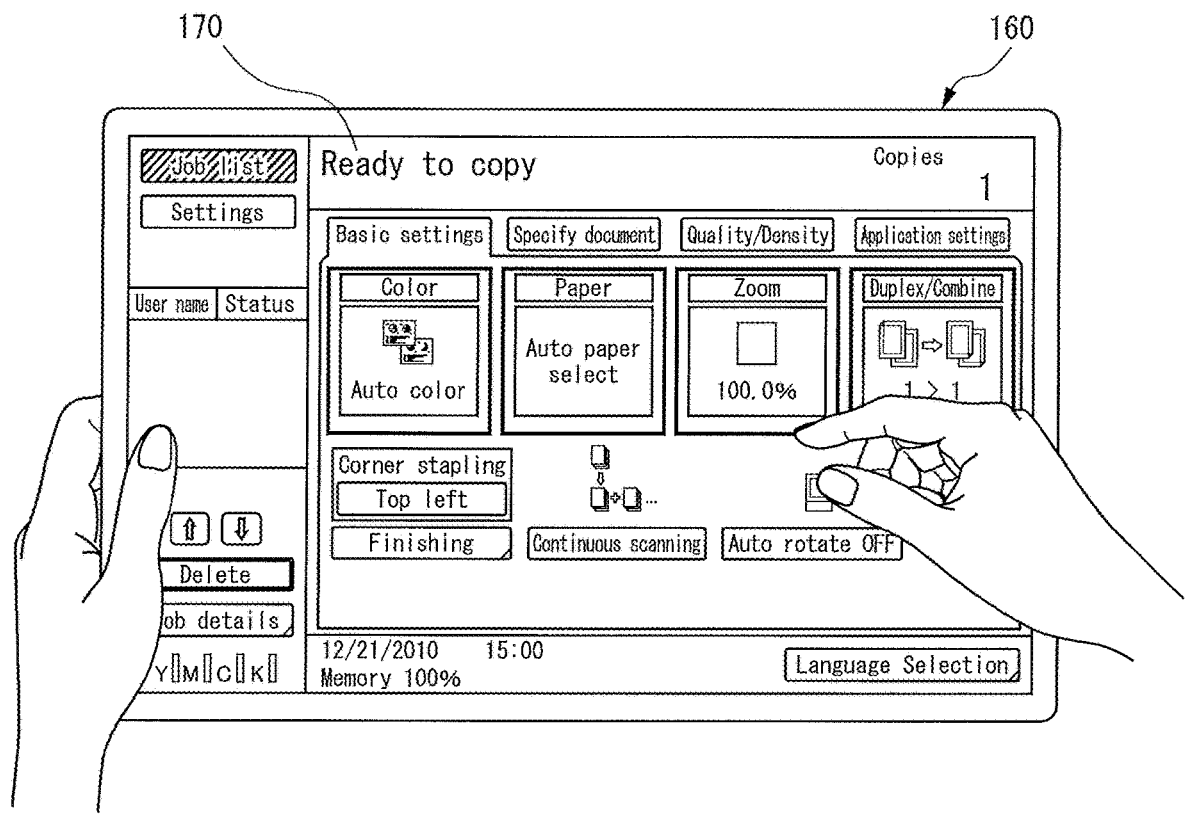
FIG. 2A is a front view of the operation terminal shown in FIG. 1.

FIG. 2A is a front view of the operation terminal 160. Referring to FIG. 2A, the touch panel 170 displays a graphical user interface (GUI) screen, such as an operation screen for the MFP 200 and input screens for various items of information, and accepts user operation through gadgets included in the screens, such as an icon, virtual button, menu, and tool bar. The operation terminal 160 can exchange data with the MFP 100 by wireless LAN (IEEE 802.11) or near field communication (NFC). The operation terminal 160 wirelessly receives from the MFP 100 instructions such as selection of GUI screens to be displayed, and in addition, wirelessly transmits to the MFP 100 information about input operation received from users.

Configuration of Touch Panel

Figure 2B:
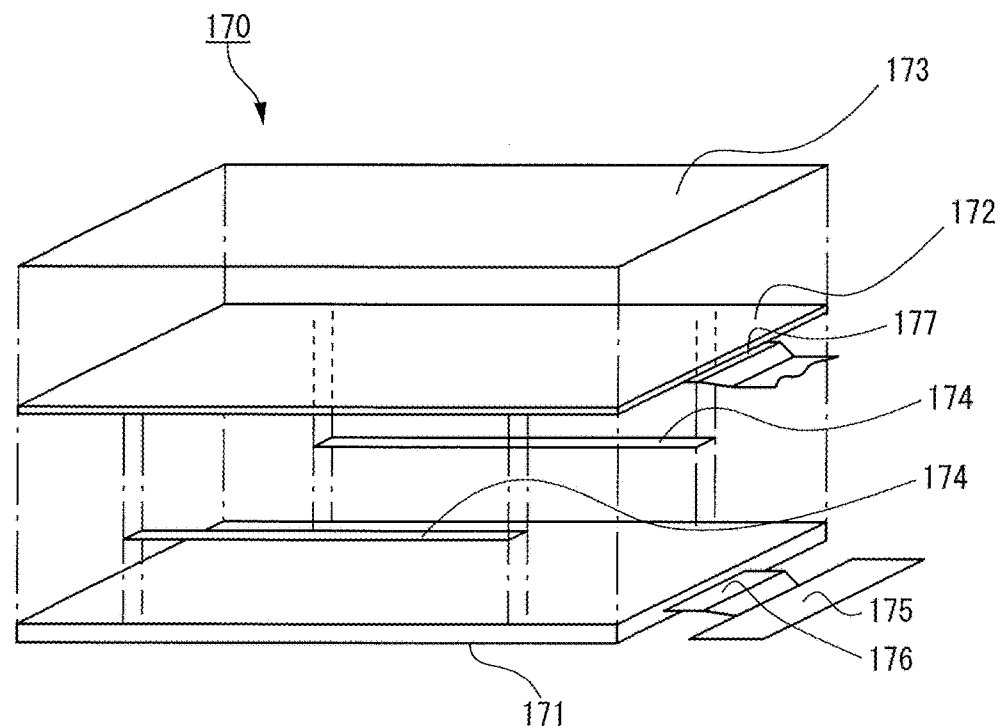
FIG. 2B is a perspective exploded view of a touch panel incorporated into the operation terminal.

FIG. 2B is a perspective exploded view of the touch panel 170. Referring to FIG. 2B, the touch panel 170 includes a stack of a liquid crystal display (LCD) 171, a touchpad 172, a cover 173, and a piezoelectric actuator 174.

The LCD 171 modulates uniform light from its backlight pixel by pixel according to voltages applied from a control circuit board 175 via a flexible printed circuit board (FPC) 176, thus changing the brightness of the screen pixel by pixel to display an image on it.

The touchpad 172, which is stacked on the screen of the LCD 171, includes the structure of a resistive type, for example. More specifically, the touchpad 172 includes a substrate that is made of transparent glass, for example, and coated on its upper surface with a transparent conductive film made of, for example, indium tin oxide (ITO), which faces across spacers another transparent conductive film coated on a flexible layer. The two conductive films are connected through cables 177 to an external electronic circuit and from it, alternately receive electric current supply. Under this condition, a touch of a user's finger on the touch panel 170 locally presses down the upper conductive film to bring it into contact with the lower one at the position of the touch, thus making the two conductive films short-circuit, which change the electric potential of either of the two conductive films, whichever is not receiving the current supply. From this change of the potential, the touch is detected, and from the amount of the change, the coordinates of the touch is calculated.

The cover 173, which is a transparent film made of resin such as polyethylene terephthalate (PET), is placed over the top surface of the touchpad 172 to protect it from external dust and moisture.

The piezoelectric actuator 174 is a strip-shaped, thin-film member made of piezoelectric material such as lead zirconate titanate (PZT). A plurality of the piezoelectric actuators 174 (two in FIG. 2B) are bonded on the rim of the touchpad 172 along its circumference, for example. During application of a voltage, the piezoelectric actuator 174 deforms, e.g. extends longitudinally, and when the voltage is removed, the actuator returns to its original form, e.g. shrinks to its original length. When the application of the voltage is repeated periodically, the piezoelectric actuator 174 vibrates at the repeated frequency of the application.

Configuration of ADF

Figure 3A:
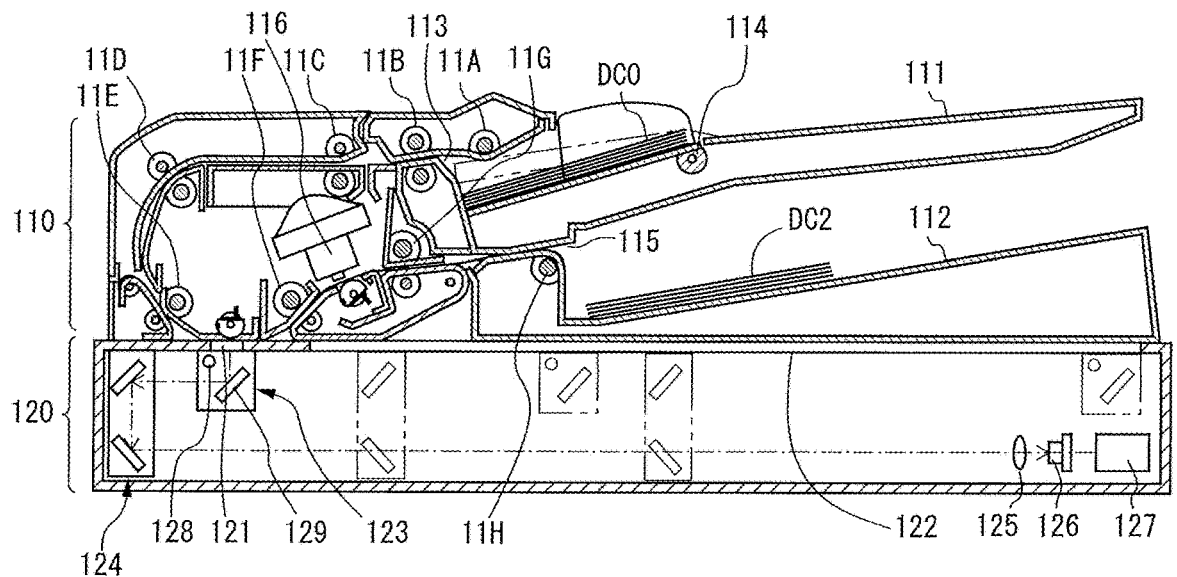
FIG. 3A is a cross-section view of the ADF and scanner along the line III-III shown in FIG. 1.

FIG. 3A is a cross-section view of the ADF 110 along the line III-III shown in FIG. 1. Referring to FIG. 3A, the ADF 110 uses a feeding roller 11A to feed documents DCO sheet by sheet from an input tray 111 into the inlet 113, a series of conveyance rollers 11B-11G to convey the documents from the inlet 113 through a conveyance path to the outlet 115, and an ejecting roller 11H to eject the documents to the output tray 112. While passing the conveyance path, each document is, at the bottom surface of the ADF 110, irradiated with light from the scanner 120 so that one side of the document is scanned, and inside the ADF 110, irradiated with light from a reverse-side scanner 116 so that the other side of the document is scanned.

Configuration of Scanner

FIG. 3A also includes a cross-section view of the scanner 120 along the line III-III shown in FIG. 1. Referring to FIG. 3A, the scanner 120 has a contact glass 121, which covers in a slit open at the top surface of the scanner 120 and faces an exposed portion of the conveyance path of documents at the bottom surface of the ADF 110. Through the contact glass 121, the scanner 120 irradiates with light one side of a document that passing through the portion of the conveyance path, and detects light reflected from the side of the document. The scanner 120 also has a platen glass 122, which covers in another opening separate from the slit at the top surface of the scanner 120. Through the platen glass 122, the scanner 120 irradiates with light one side of a document that is placed on the platen glass 122, and detects light reflected from the side of the document.

The scanner 120 has a slider 123, which is mounted within the scanner 120 to be able to reciprocate between a position directly below the contact glass 121 and an edge of the platen glass 122. The slider 123 irradiates one side of the document with light from a line light source 128 through the top surface of the slider 123 and either the contact glass 121 or the platen glass 122. The slider 123 then reflects light, which has been reflected from the side of the document and then has entered the top surface of the slider 123, with a mirror 129 toward a pair of mirrors 124 and a lens 125. These optical elements 124, 125 focus the reflected light on a line sensor 126 to make it detect the intensity of the light. Since the intensity varies depending on colors (more accurately, light reflection rates) on the side of the document, electric signals that the line sensor 126 transmits in response to the detection of the intensity represent images displayed on the side of the document. Similarly, electric signals that the reverse-side scanner 116 transmits represent images displayed on another side of a document. The scanner 120 has an image processing circuit 127, which converts these electric signals into image data and transmits the image data to the printer 130 or an external electronic device.

Configuration of Printer

Figure 3B:
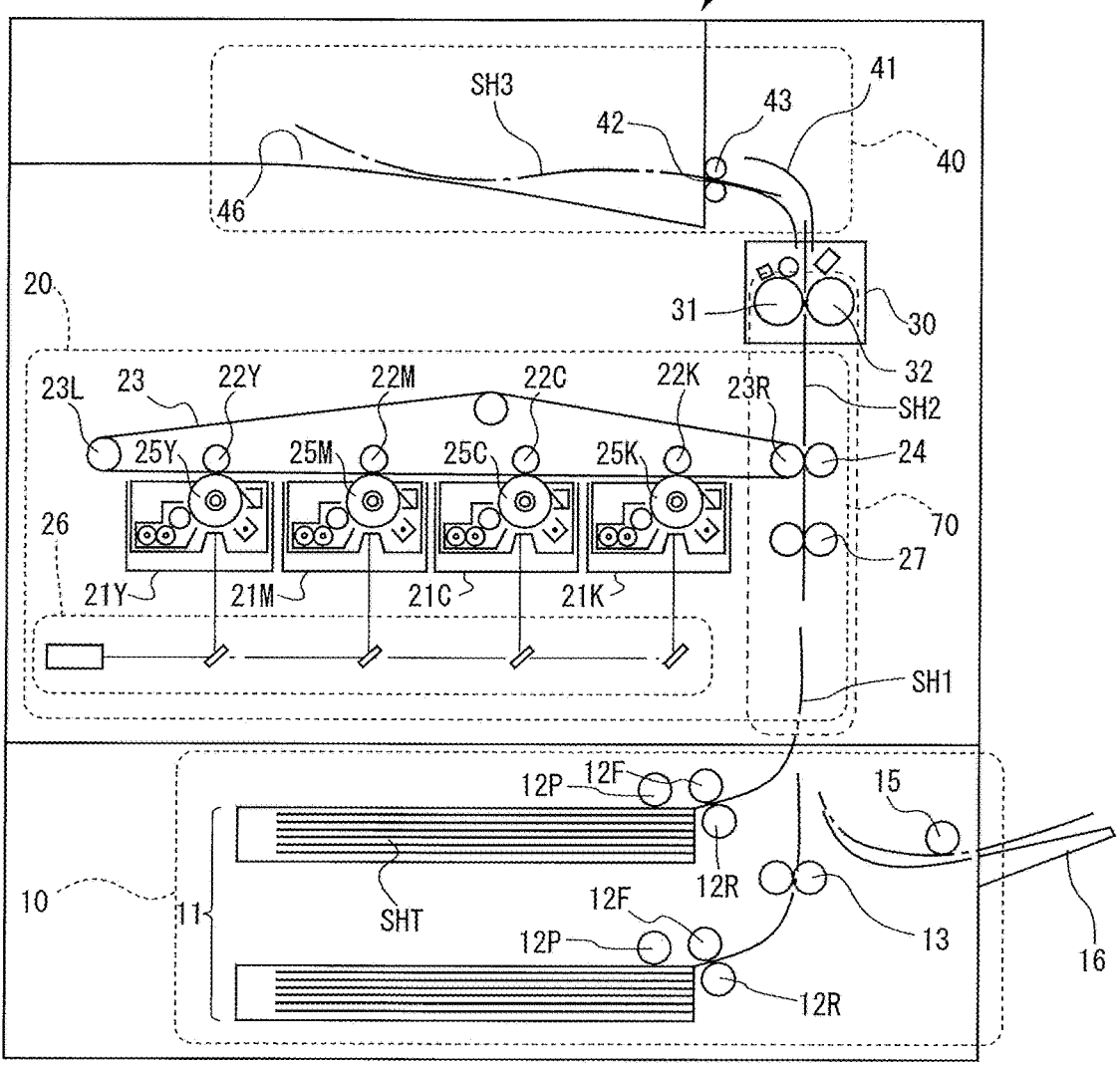
FIG. 3B is a front view illustrating a schematic configuration of the printer shown in FIG. 1.

FIG. 3B is a front view illustrating a schematic configuration of the printer 130. FIG. 3B represents elements of the printer 130 as if they can be seen through the front face of the body. Referring to FIG. 3B, the printer 130 is an electrophotographic color printer, i.e. color laser printer, which includes a feeder section 10, an imaging section 20, a fixing section 30, and an ejecting section 40. These elements 10, 20, 30, 40 cooperate to form images on sheets based on image data while conveying the sheets within the body of the MFP 100.

The feeder section 10 uses feeder rollers 12P, 12F, 12R, 13, 15 to feed each sheet SH1 from a stack of sheets SHT stored in the paper cassettes 11 or on a manual feed tray 16 to the imaging section 20. The material of the sheets SHT is paper or resin; their paper type is plain, high-quality, coated, etc.; and their size is A3, A4, A5, B4, etc.

The imaging section 20 forms a toner image on a sheet SH2 conveyed from the feeder unit 10. More specifically, the imaging section 20 first makes four imaging units 21Y, 21M, 21C, 21K expose surfaces of their respective photoreceptor drums 25Y, 25M, 25C, 25K to laser lights from an exposure unit 26 in patterns based on image data to form electrostatic latent images on the surfaces. From the electrostatic latent images, the imaging units 21Y, . . . , 21K next develop toner images of their respective colors, i.e. yellow (Y), magenta (M), cyan (C), and black (K). The imaging units 21Y, . . . , 21K then transfer the resultant four one-colored toner images in order by electric fields between primary transfer rollers 22Y, 22M, 22C, 22K and the photoreceptor drums 25Y . . . , 25K, from the photoreceptor drums 25Y, . . . , 25K onto the same position on a surface of an intermediate transfer belt 23, thus forming a single four-colored toner image on the position. The imaging section 20 further transfers this color toner image by an electric field between the intermediate transfer belt 23 and a secondary transfer roller 24, onto a surface of the sheet SH2 passing through the nip between the intermediate transfer belt 23 and the secondary transfer roller 24. After that, the imaging section 20 applies a voltage to the sheet SH2 to separate it from the secondary transfer roller 24 and send it to the fixing unit 30.

The fixing section 30 thermally fixes the color toner image to the sheet SH2 conveyed from the imaging section 20. More specifically, when the sheet SH2 passes through the nip between a fixing roller 31 and a pressure roller 32, the fixing roller 31 applies heat from its built-in heater to the sheet SH2, and the pressure roller 32 applies pressure to the heated portion of the sheet SH2, pressing the sheet SH2 against the fixing roller 31. The heat from the fixing roller 31 and the pressure from the pressure roller 32 fix the toner image onto a surface of the sheet SH2. Then, the fixing section 30 transfers the sheet SH2 from its top portion along a guide board 41 to the ejection slot 42.

The ejecting section 40 uses an ejecting roller 43 to eject a sheet SH3 that the fixing section 30 sends out, from the ejection slot 42 and store it on the ejection tray 46.

Electronic Control System of Image Processing Device

FIG. 3 is a block diagram illustrating a configuration of the electronic control system of the MFP 100. Referring to FIG. 3, the electronic control system includes, in addition to the printer 130, an operation unit 50, an image input unit 60, and a main controller unit 70, which are connected to a bus 90 to be able to communicate with each other.

—Operation Unit—

The operation unit 50 includes input devices and a control circuit. The input devices include, in addition to the operation terminal 160, operation switches 51 and a proximity switch 52. The operation switches 51 collectively mean mechanical switches, such as push buttons, mounted on the body of the MFP 100, such as the holder 180. The proximity switch 52 is of an inductive, capacitive, ultrasonic, or photoelectric type, which is embedded in the holder 180 and discriminates between the presence and absence of the operation terminal 160 held by the holder 180. The inductive switch generates an alternating magnetic field around the holder 180 and detects a power loss caused by eddy currents that the magnetic field induces in a piece of metal included in the operation terminal 160. The capacitive switch applies an alternating electric field to an electrode embedded in a surface of the holder 180 to which the operation terminal 160 is to be attached, and determines the capacitance between the electrode and the body of the operation terminal 160. The ultrasonic and photoelectric switches emit ultrasonic and light waves upward from a surface of the holder 180 and detect waves reflected by the operation terminal 160. The control circuit 53 collectively means a group of electronic circuits built in the body of the MFP 100, interpreting user's input operation from output of the input devices 51, 52 and notifies the main controller unit 70 of the input operation. The control circuit 53, for example, in response to a press of a push button mounted on the holder 180, identifies the button and generates information about the input operation corresponding to the button, hereinafter referred to as "operation information," and transfers it to the main controller unit 70. The control circuit 53 also, in response to detection by the proximity switch 52, notifies the operation terminal 160 of attachment to the holder 180.

The operation terminal 160 includes, in addition to the touch panel 170 and push buttons 161, a vibrator unit 162, a sound generator unit 163, a speaker 164, a memory unit 165, a controller unit 166, a display unit 167, and a communications unit 168. The vibrator unit 162, which is combination of the piezoelectric actuator 174 shown in FIG. 2B and its driver circuit, drives the piezoelectric actuator 174 to apply vibration to the touch panel 170, esp. the display region of the operation screen. The sound generator unit 163 is a digital signal processor (DSP) specialized for processing digital audio data such that audible sounds represented by the audio data are provided with desired attributes such as sound pressures and tones, then transferred to the speaker 164. The speaker 164 reproduces the audible sounds from the audio data. The memory unit 165 is a rewritable, non-volatile semiconductor memory device such as an electrically-erasable programmable read-only memory (EEPROM) or a flash memory, or a high-capacity, non-volatile storage device such as a hard disc drive (HDD) or a solid state drive (SSD). The memory unit 165, for example, stores firmware and application programs for making the controller unit 166 realize various functions of the operation terminal 160, and provides the controller unit 166 with storage for data such as environmental variables. The controller unit 166, which is configured with an integrated circuit such as a microprocessor (MPU/CPU), an ASIC, or a FPGA, executes firmware, etc., stored in the memory unit 165 to realize various functions of the operation terminal 160. The controller unit 166, in particular, accepts user's input operation through the push buttons 161 shown in FIG. 1 or the touchpad 172 shown in FIG. 2B, then not only making the vibrator unit 162 or the sound generator unit 613 generate a signal responsive to the input operation, but also interpreting the input operation and generating operation information. The display unit 167 is a combination of the LCD 171, the control circuit board 175, and the FPC 176, which are shown in FIG. 2B, and a DSP providing them with image data in an appropriate format. In response to instructions from the main controller unit 70, the display unit 167 processes image data of a GUI screen such as the operation screen, thus reproducing the GUI screen on the touch panel 170. The communications unit 168 is a communications circuit supporting the wireless LAN or NFC, using electric waves to connect the controller unit 166 to the bus 80 of the MFP 100 directly or via an external access point so that the controller unit 166 can exchange data with the bus 80. Through this connection, the communications unit 168 receives instructions and image data from the main controller unit 70, and notification of attachment of the operation terminal 160 to the holder 180 from the control circuit 53 of the operation unit 50, and then transmits them to the controller unit 166. The communications unit also transmits operation information generated by the controller unit 166.
—Image Input Unit—

The image input unit 60 includes, in addition to the ADF 110 and the scanner 120 shown in FIG. 3A, a memory interface (I/F) 61 and a network (LAN) I/F 62. The memory I/F 61, through a video input terminal such as a universal serial bus (USB) port or memory card slot, reads image data to be printed from an external memory device such as a USB memory, a HDD, or a SSD, and writes image data captured by the scanner 120 to the external memory device. The LAN I/F 62 has a wired or wireless connection to an external local area network or electronic device, and receives image data to be printed from the connected network or device, and transmits image data captured by the scanner 120 to them.
—Main Controller Unit—

Figure 4:
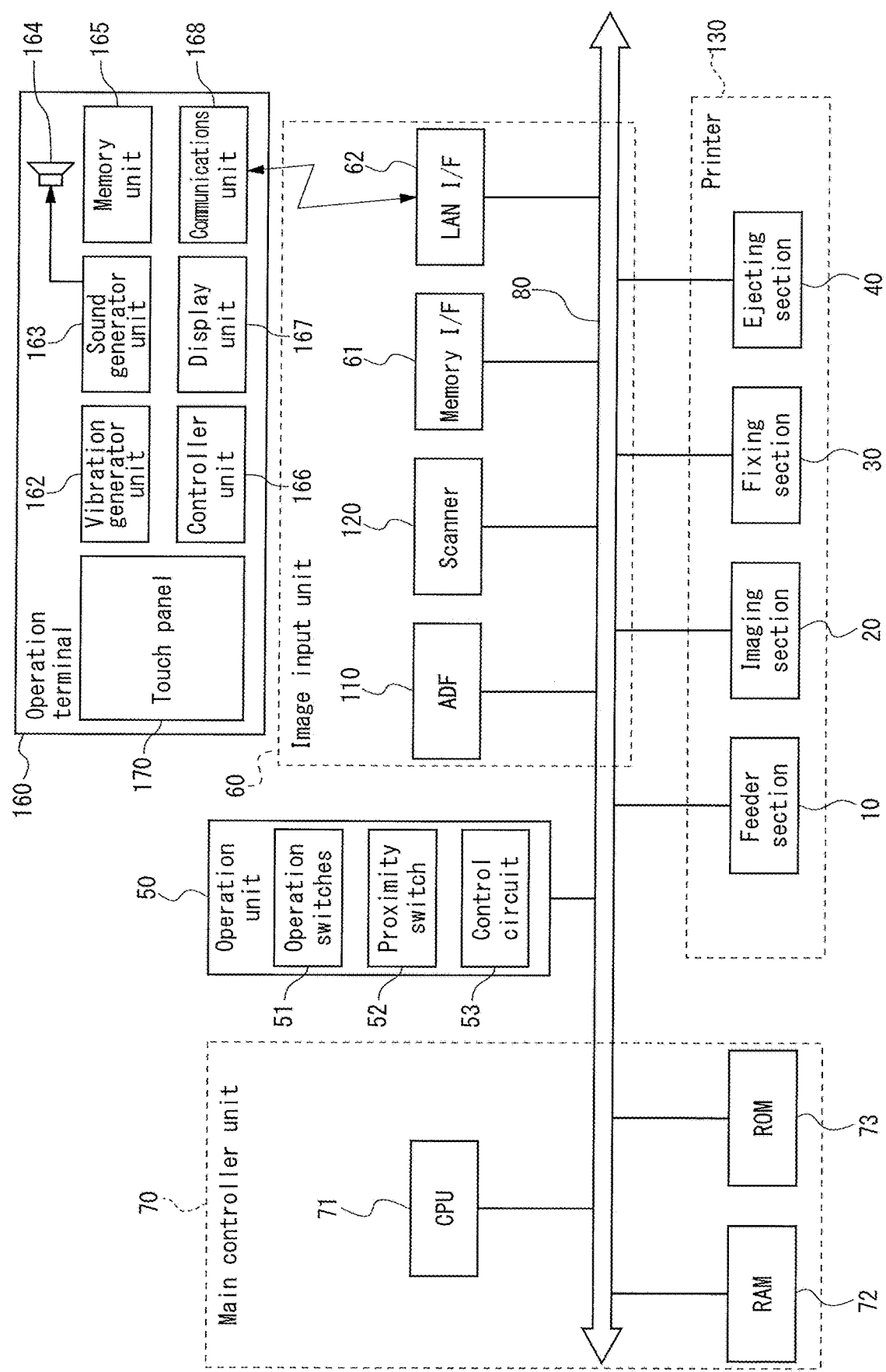
FIG. 4 is a block diagram illustrating a configuration of the electronic control system of the image processing device shown in FIG. 1.

The main controller unit 70 is an integrated circuit implemented on a printed circuit board, which is mounted inside the MFP 100. Referring to FIG. 4, the main controller unit 70 includes a CPU 71, a RAM 72, and a ROM 73. The CPU 71, which is configured with a single MPU, executes a variety of firmware to realize various functions of control over the other elements 10, 20, . . . , 50, 60, and 160. For example, the CPU 71 makes the operation terminal 160 display a GUI screen such as the operation screen and accept user's input operation. In response to the reception of operation information showing each input operation, the CPU 71 selects an operation mode of the MFP 100 such as a running, waiting, or sleep mode, and instructs processes according to the operation mode to the other elements 10, . . . , 160. The RAM 72, which is a volatile semiconductor memory device such as a dynamic RAM (DRAM) and a static RAM (SRAM), provides the CPU 71 with a workspace to execute firmware and temporarily stores image data to be printed that the image input unit 60 receives. The ROM 73 consists of a non-writable, non-volatile memory device and a rewritable non-volatile memory device. The former stores firmware, and the latter includes a semiconductor memory device such as EEPROM, flash memory, and SSD, or a HDD, and provides the CPU 71 with storage for data such as environmental variables.

Functions of Operation Terminal

Figure 5:
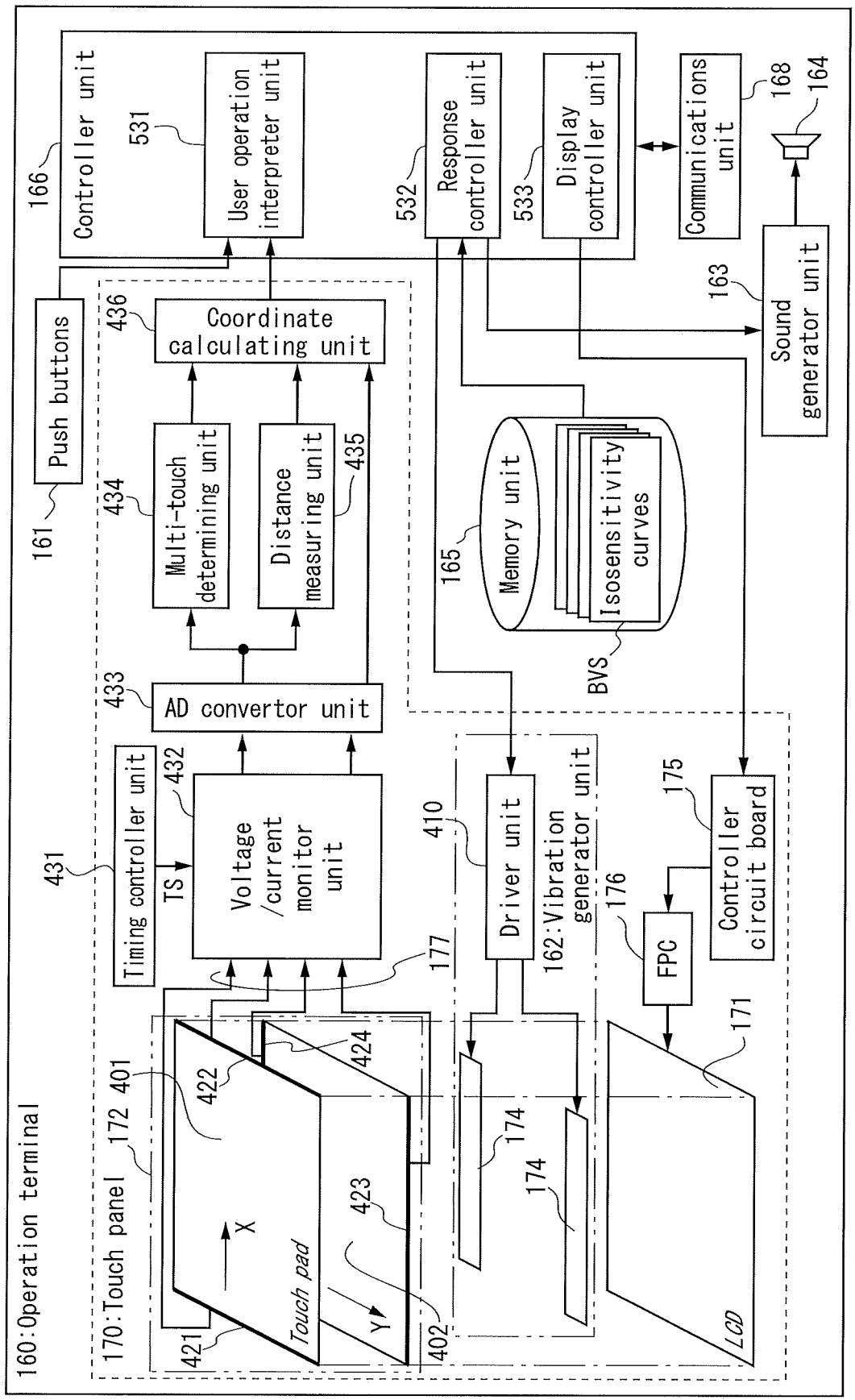
FIG. 5 is a functional block diagram of the operation terminal shown in FIG. 2.

FIG. 5 is a functional block diagram of the operation terminal 160. Referring to FIG. 5, the touch panel 170 is of a 4-wire resistive type that supports multi-touch. More concretely, the touch panel 170 includes, in addition to the elements shown in FIG. 2B such as the LCD 171 and the touchpad 172, a timing controller unit 431, a voltage/current monitor unit 432, an analog-digital (AD) convertor unit 433, a multi-touch determining unit 434, a distance measuring unit 435, and a coordinate calculating unit 436. These elements 431-436 are electronic circuit modules, which are, for example, mounted on a print circuit board built in the operation terminal 160, or implemented into a single integrated circuit. With these elements, the touch panel 170 detects a touch by a user's finger on the touchpad 172, and calculates the coordinates of the touch.

The controller unit 166 executes firmware or application programs stored in the memory unit 165 to function as a user operation interpreter unit 531, a response controller unit 532, and a display controller unit 533. The user operation interpreter unit 531 interprets user's input operation indicated by the touchpad 172 or each push button 161 to issue operation information. In response to the input operation, the response controller unit 532 makes the vibrator unit 162 generate responsive vibration or makes the sound generator unit 163 produce responsive sounds. More concretely, in response to a touch that the touch panel 170 has detected, the response controller unit 532 indicates, to the vibrator unit 162, an amplitude distribution in frequency of responsive vibration, i.e. a spectrum of the responsive vibration, or to the sound generator unit 163, data about responsive sounds. According to the instruction, the vibrator unit 162 drives the piezoelectric actuator 174, thus applying responsive vibration to the touchpad 172, or the sound generator unit 163 drives the speaker 164, thus reproducing audible sounds from the speaker 164. The display controller unit 533 serves as a DSP for the LCD 171, the controller circuit board 175, and the FPC 176. More specifically, the display controller unit 533, in response to instructions of the main controller unit 70, processes and sends image data of GUI screens to the controller circuit board 175, thus making the FPC 176 use the image data for modulation in brightness of each pixel of the LCD 171. Thus, the GUI screens are reproduced on the touch panel 170.

—Sensing of Touch by Touch Panel—

The touchpad 172 includes two transparent, rectangular-shaped, conductive films 401, 402, such as ITO thin films. These films 401, 402 are stacked in parallel one on top of the other, keeping a fixed distance therebetween. The upper film 401 includes a first electrode 421 and a second electrode 422 along either of its shorter sides, and has constant electric resistivity in the direction of its longer sides, the direction of x axis in FIG. 5. The lower film 402 includes a third electrode 423 and a fourth electrode 424 along either of its longer sides, and has constant electric resistivity in the direction of its shorter sides, the direction of y axis in FIG. 5. Every electrode 421, . . . , 424 is connected to the voltage/current monitor unit 432 via the cables 177.

The timing controller unit 431 uses a built-in clock to generate a timing signal TS at a constant frequency of, e.g. a few dozen kHz, and sends the signal to the voltage/current monitor unit 432. In synchronization with this timing signal TS, the voltage/current monitor unit 432 repeats the following actions (1) and (2) in turn: (1) applying a bias voltage between the first electrode 421 and the second electrode 422 to monitor the amount of current flowing therebetween, and at the same time, keeping the third electrode 423 and the fourth electrode 424 in a high-impedance state, in which each electrode has a resistance sufficiently higher than that of the entirety of each conductive film 401, 402, to monitor the potential of each electrode; and (2) applying a bias voltage between the third electrode 423 and the fourth electrode 424 to monitor the amount of current flowing therebetween, and at the same time, keeping the first electrode 421 and the second electrode 422 in a high-impedance state to monitor the potential of each electrode. The AD convertor unit 433 converts analog values of the potential and current amount that the voltage/current monitor unit 432 measures into digital values.

The multi-touch determining unit 434 monitors the digital value of the current amount sent from the AD convertor unit 433, and if the current amount exceeds a reference value, informs the coordinate calculating unit 436 of detection of a multi-touch. This reference value represents, during the action (1) of the voltage/current monitor unit 432, the amount of current that flows between the first electrode 421 and the second electrode 422 in the case of the two conductive films 401, 402 short-circuiting at only one point, and during the action (2), the amount of current that flows between the third electrode 423 and the fourth electrode 424 in the same case. If the films 401, 402 short-circuit at two or more points simultaneously, current flows between the points through either of the films in parallel. In contrast to the case of the films 401, 402 short-circuiting at only one point, the resistance value between the first electrode 421 and the second electrode 422 is reduced during the action (1), and the resistance value between the third electrode 423 and the fourth electrode 424 is reduced during the action (2). As a result, the amounts of the current between the electrode pairs 421-422 and 423-424 exceed the respective reference values. These exceeding current amounts thus show that the films 401, 402 short-circuit at two or more points, i.e. multi-touches.

The distance measuring unit 435 monitors the digital value of the current amount sent from the AD convertor unit 433 to estimate, from the current amount, the distance between two points at which the two conductive films 401, 402 short-circuit simultaneously. As described above, the films 401, 402 short-circuiting at two or more points, in contrast to those short-circuiting at only one point, reduce the resistance value between the first electrode 421 and the second electrode 422 during the action (1), and the resistance value between the third electrode 423 and the fourth electrode 424 during the action (2). The reduction of each resistance value is substantially determined by the distance between two points at which the films 401, 402 seem to short-circuit simultaneously. By using this relationship, the distance measuring unit 435 estimates the distance from the difference between the amount of current flowing through each electrode pair 421-422, 423-424 and the reference value.

The coordinate calculating unit 436 monitors the digital value of the potential of each electrode 421, . . . , 424 sent from the AD convertor unit 433 to calculate from the potential the coordinates of the point at which a user's finger touches the touch panel 170 as follows.

During the action (1) of the voltage/current monitor unit 432, the bias voltage and constant electric resistivity between the first electrode 421 and the second electrode 422 causes a constant potential gradient in the direction of the longer sides of the upper conductive film 401, i.e., the direction of the x axis. Under this condition, the upper film 401 comes into contact with the lower film 402 within a range, and then both the third electrode 423 and the fourth electrode 424 have substantially the same potential as the center point of the range since these electrodes 423, 424 are kept in the high-impedance state. The potential of the center point is determined by the voltage division ratio of the resistances of two regions: one is from the first electrode 421 to the center point, and the other is from the center point to the second electrode 422. This voltage division ratio is equal to the ratio in which the center point internally divides the distance from the first electrode 421 to the second electrode 422, i.e. the ratio of the distance from the first electrode 421 to the center point and the distance from the center point to the second electrode 422.

In view of this discussion, the coordinate calculating unit 436 first detects the change in the potentials of the third electrode 423 and the fourth electrode 424 to determine the voltage division ratio in the short-circuiting range from the potentials after the change, the potential of the first electrode 421 or the second electrode 422, and the bias voltage between these electrodes 421, 422. The coordinate calculating unit 436 next calculates, from the voltage division ratio, the distance between the center point and the first electrode 421 or the second electrode 422 as the coordinates of the center point in the direction of the longer sides of the conductive films 401, 402, i.e. the x coordinate of the center point shown in FIG. 5. When the output of the multi-touch determining unit 434 indicates no detected multi-touch, the coordinate calculating unit 436 transmits the coordinates of the center point as the coordinates of a single touch in the direction of the longer sides of the films 401, 402, i.e. the x coordinate of the touch. When the output of the multi-touch determining unit 434 indicates a detected multi-touch, the coordinate calculating unit 436 transmits both the sum of the coordinates of the center point plus a half of the distance provided by the distance measuring unit 435 and the difference of the coordinates minus the half of the distance, as the coordinates of double touches in the direction of the longer sides of the films 401, 402, i.e. the x coordinates of the touches.

During the action (2) of the voltage/current monitor unit 432, the bias voltage and constant electric resistivity between the third electrode 423 and the fourth electrode 424 causes a constant potential gradient in the direction of the shorter sides of the lower conductive film 402, i.e., the direction of the y axis. Both the first electrode 421 and the second electrode 422 have substantially the same potential as the center point of the range in which the two conductive films 401, 402 short-circuit since these electrodes 421, 422 are kept in the high-impedance state. The potential of the center point is determined by the voltage division ratio of the resistances of two regions: one is from the third electrode 423 to the center point, and the other is from the center point to the fourth electrode 424. This voltage division ratio is equal to the ratio in which the center point internally divides the distance from the third electrode 423 to the fourth electrode 424.

In view of this discussion, the coordinate calculating unit 436 first detects the change in the potentials of the first electrode 421 and the second electrode 422 to determine the voltage division ratio in the short-circuiting range from the potentials after the change, the potential of the third electrode 423 or the fourth electrode 424, and the bias voltage between the electrodes 423, 424. The coordinate calculating unit 436 next calculates, from the voltage division ratio, the distance between the center point and the third electrode 423 or the fourth electrode 424. Depending on whether the output of the multi-touch determining unit 434 represents a detected multi-touch or not, the coordinate calculating unit 436 further transmits the calculated distance itself, or a pair of the sum and difference between the calculated distance and a half of the distance provided by the distance measuring unit 435, as the coordinates of touch(es) in the direction of the shorter sides of the two conductive films 401, 402, i.e. the y coordinate(s) of the touch(es).

—Interpretation of User Operation—

The user operation interpreter unit 531 checks the coordinates of a touch received from the coordinate calculating unit 436 against the coordinates of gadgets, such as virtual buttons and menu items, included in a GUI screen to select a possible target for user operation from among the gadgets. Referring to temporal change in the coordinates of touches, the user operation interpreter unit 531 further discriminates among types of gesture, such as tap, flick, slide, and rotation, and based on the possible target and the types, interprets input operation indicated by the user's gesture. In addition, the user operation interpreter unit 531 monitors whether one of the push buttons 161 on the operation terminal 160 is pushed or not, and if one of the push buttons is pushed, the unit identifies the pushed button to interpret the process assigned to the button as start or stop of printing or the like. Based on the interpretation, the user operation interpreter unit 531 generates operation information and informs the main controller unit 70 of the operation information.

—Generation of Responsive Vibration (FFB)—

As FIG. 5 shows, the vibrator unit 162 includes a driver unit 410, which is a driving circuit for the piezoelectric actuator 174, periodically applying a voltage across the actuator 174. The driver unit 410, in particular, adjusts the spectrum of the waveform of the voltage to a spectrum of responsive vibration indicated by the response controller unit 532. This causes the spectrum of vibration applied from the piezoelectric actuator 174 to the touchpad 172 to substantially conform the spectrum of responsive vibration.

The response controller unit 532 determines the spectrum of responsive vibration as follows. The response controller unit 532 first detects the fact that the touch panel 170 has sensed a touch, from the fact that the user operation interpreter unit 531 has received the coordinates of the touch from the coordinate calculating unit 436. In response to the reception, the user operation interpreter unit 531 selects a gadget as the possible target for user operation, and then the response controller unit 532 determines whether the gadget is one of types to be responded with vibration or not. The types are selected to meet the condition that they should allow a user to perceive a tactile feedback on his/her touch. When the possible target for user operation is one of the types, the response controller unit 532 checks whether or not it has received from the control circuit 53 of the operation unit 50 notification of attachment of the operation terminal 160 to the holder 180 of the MFP 100. When having not received the notification, the response controller unit 532 assigns a first spectrum to the spectrum of responsive vibration. The first spectrum is specified by firmware or an application program stored in the memory unit 165, for example, and usually has pattern varying for the different types of gadgets, such as virtual buttons, menus, and toolbars, to be responded with vibration, or for the different types of gesture, such as tap, flick, and slide. When the response controller unit 532 has received the notification, the operation terminal 160 is now held by the holder 180. Thus, the response controller unit 532 deforms the first spectrum into a second spectrum, and assigns the second spectrum to the spectrum of responsive vibration. The second spectrum indicates a lower level of responsive vibration than the first spectrum.

—Spectrum of Responsive Vibration—

Responsive vibration is applied from the piezoelectric actuator 174 to the touchpad 172. Then, the touchpad 172 resonates with components of the responsive vibration that have frequencies equal to the natural frequencies of the touchpad 172. Accordingly, the spectrum of the responsive vibration is expressed as a combination of vibration levels at the different natural frequencies of the touchpad 172, such as a combination of vibration intensities or acceleration rates of a medium.

Figure 6A:
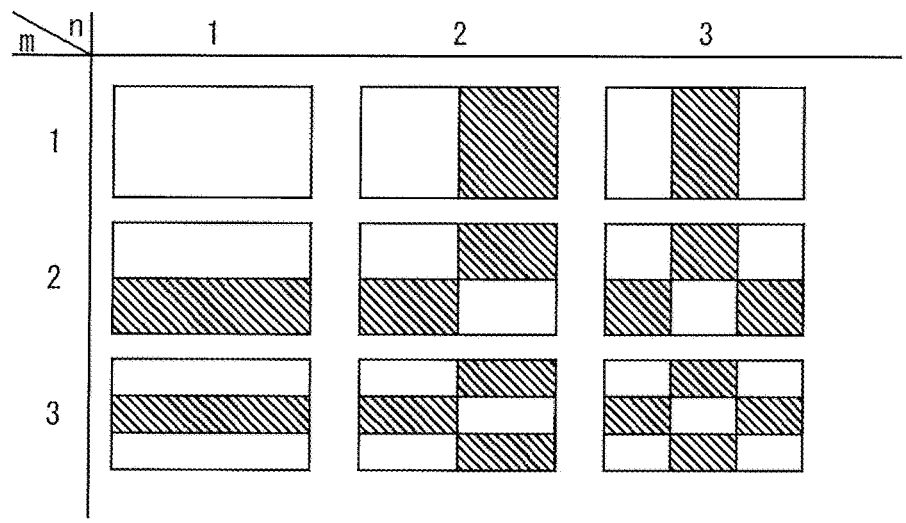
FIG. 6A is a tabulated list of node curves of natural vibration modes (m=1, 2, 3; n=1, 2, 3) of the touchpad shown in FIG. 2B.

FIG. 6A is a tabulated list of node curves of natural vibration modes (m=1, 2, 3; n=1, 2, 3) of the touchpad 172. In FIG. 6A, each square represents the outline of the touchpad 172, and each boundary line between blank and hatched areas denotes a "node curve" of natural vibration, i.e. locations at which vibration levels steadily equal to zero. Since every side of the touchpad 172 is fixed on the LCD 171, each node curve appears within the touchpad 172 as a line parallel to the longer or shorter side of the touchpad. A value m, which is the sum of one plus the number of the node lines parallel to the longer side of the touchpad 172, is referred to as an "order for the longer-side direction," and another value n, which is the sum of one plus the number of the node lines parallel to the shorter side of the touchpad 172, is referred to as an "order for the shorter-side direction." Pairs (m, n) of these orders distinguish the natural vibration modes. Either of the orders m, n can be any integer of one or more. In general, the larger the number m+n−2 of node curves is, the higher the natural frequency is.

Figure 6B:
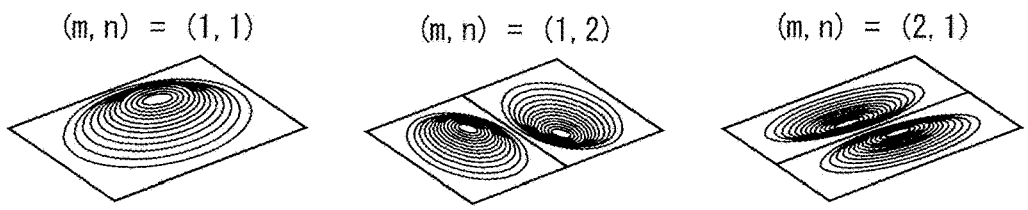
FIG. 6B is a schematic drawing showing shapes of natural vibration modes (m, n)=(1, 1), (1, 2), and (2, 1)
Figure 6C:
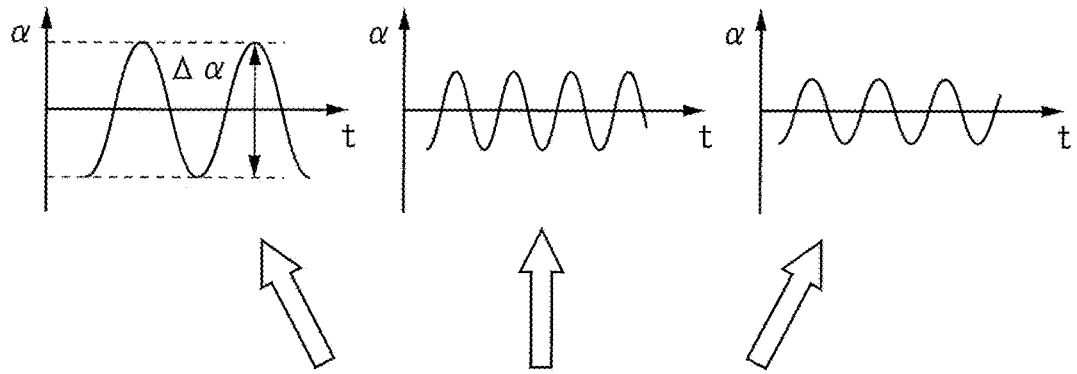
FIG. 6C is a graph of the waveform of each mode.

FIG. 6B is a schematic drawing showing shapes of natural vibration modes (m, n)=(1, 1), (1, 2), and (2, 1). FIG. 6C is a graph of the waveform of each mode. Curves shown in FIG. 6B represent contour lines on the surface of the touchpad 172. Temporal changes in the height of each point within the surface entail temporal changes in the acceleration rate of the point. These changes are expressed by the graph of FIG. 5C. Referring to FIG. 6B, the lowest-order mode (m, n)=(1, 1) has no node lines within the touchpad 172, and accordingly the entirety of the surface vibrates in its normal direction in the same phase to change the heights of points within the surface to form a sinusoidal wave. The modes (m, n)=(1, 2), (2, 1) at the next lowest natural frequency have only one node line within the touchpad 172, and both portions of the surface facing across the node line vibrate in its normal direction in the opposite phases. More specifically, one of the portions bulges upward to form a convex shape while the other dips downward to form a concave shape. Within each portion, the heights of points change to form the same sinusoidal wave.

Figure 6D:
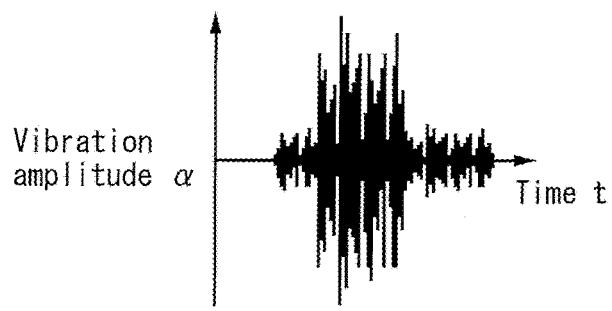
FIG. 6D is a graph of the waveform of an actual vibration appearing on the touchpad.

FIG. 6D is a graph of the waveform of an actual vibration appearing on the touchpad 172. Referring to FIG. 6D, the actual vibration has such a complicated waveform. This vibration is, however, a composite of the sinusoidal waves in FIG. 6C with different amplitudes Δα among the natural vibration modes in FIG. 6A. Thus, responsive vibration is expressed by a combination of the amplitudes Δα in intensity a among the natural vibration modes (m, n).

Figure 7:
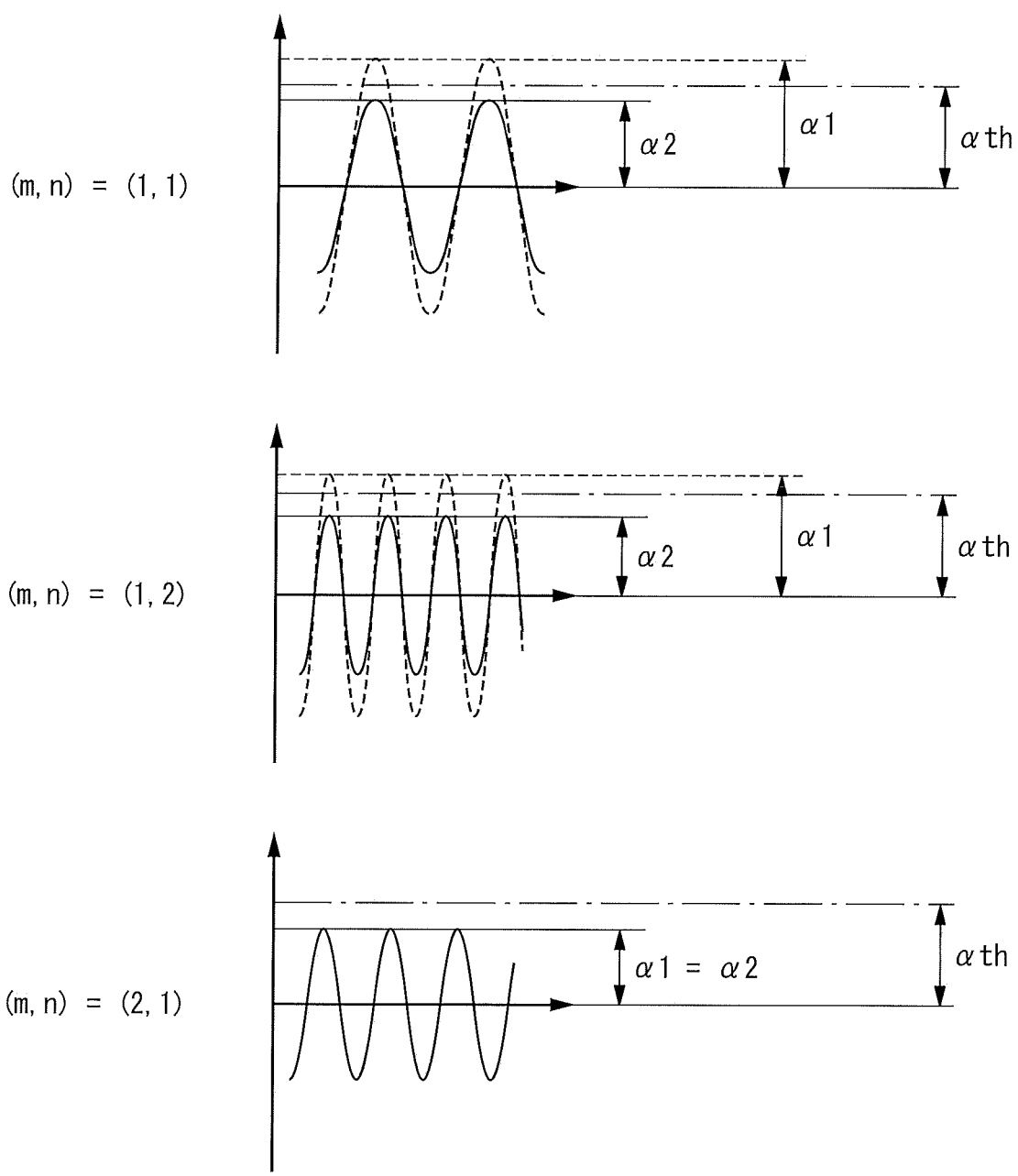
FIG. 7 is a graph of the waveform of the natural vibration modes (m, n)=(1, 1), (1, 2), (2, 1) included in responsive vibration of the touch panel shown in FIG. 2B.

FIG. 7 is a graph of the waveform of the natural vibration modes (m, n)=(1, 1), (1, 2), (2, 1) that responsive vibration includes. In FIG. 7, broken lines show the first spectrum, and bold lines show the second spectrum. As these waveforms show, the level α2 of each mode in the second spectrum is lower than the level α1 of the same mode in the first spectrum, and not higher than a threshold value αth. This threshold value αth represents the intensity of responsive vibration that can adversely affect action of any of the elements 110, 120, 130 of the image processing unit to an extent no higher than an acceptable upper limit.

Let us explain that more concretely. For example, when the ADF 110 is conveying a document, the threshold value αth is determined so that responsive vibration displaces the document on the contact glass 121, at most, to the extent of displacement that can provide only invisible distortion to any image that the scanner 120 captures from the document. When the slider 123 of the scanner 120 is moving, the threshold value αth is determined so that responsive vibration displaces the slider 123, at most, to the extent of displacement that can provide only invisible distortion to any image that the scanner 120 captures from the document. When the printer 130 is printing on a sheet, the threshold value αth is determined so that responsive vibration displaces the sheet itself, any roller 12P, 12F, . . . , conveying the sheet, any PC drum 25Y, . . . , 25K, the intermediate transfer belt 23, or any transfer roller 22Y, . . . , 24, at most, to the extent of displacement that can provide only invisible distortion to any toner image formed on the sheet.

In general, the threshold value αth varies in level depending on which of the ADF 110, the scanner 120, and the printer 130 is operating. When the same element is operating, the threshold value αth usually varies within a negligible range among the different natural vibration modes. Thus, the response controller unit 532 sets the threshold value αth to different levels depending on which element 110, 120, 130 of the image processing unit is operating, and applies the value as a common threshold value to any natural vibration mode.

When the response controller unit 532 has received from the control circuit 53 of the operation unit 50 notification of attachment of the operation terminal 160, the operation terminal 160 is held by the holder 180, and thus there is a risk that responsive vibration could adversely affect action of any of the elements 110, 120, 130 of the image processing unit. Thus, the response controller unit 532 first compares the level α1 of each natural vibration mode included in the first spectrum with the threshold value αth. If the level α1 exceeds the threshold value αth, the response controller unit sets the level α2 of the same mode included in the second spectrum to a value not higher than the threshold value αth. By applying a similar process to every mode included in the first spectrum, the response controller unit 532 deforms the first spectrum into the second spectrum.

Let us explain that more concretely. For example, the first spectrum that FIG. 7 shows has the lowest and the next lowest natural vibration modes (m, n)=(1, 1), (1, 2) whose levels α1 exceed the threshold value αth. Accordingly, the response controller unit 532 sets the levels α2 of these modes included in the second spectrum to the threshold value αth. The first spectrum also has the other next lowest natural vibration mode (m, n)=(2, 1) whose level α1 does not exceed the threshold value αth. Thus, the response controller unit 532 sets, to this level α1, the level α2 of the same mode included in the second spectrum.

Generation of Responsive Sounds

The response controller unit 532 determines the attributes of responsive sounds as follows. The response controller unit 532 first detects the fact that the touch panel 170 has sensed a touch, from the fact that the user operation interpreter unit 531 has received the coordinates of the touch from the coordinate calculating unit 436. In response to the reception, the user operation interpreter unit 531 selects a gadget as the possible target for user operation, and then the response controller unit 532 determines whether or not the gadget is one of types to be responded with sounds. The types are selected to meet the condition that they should allow a user to surely perceive that the touch panel 170 detects his/her touch on a gadget such as a virtual button. When the possible target for user operation is one of the types, the response controller unit 532 checks whether or not it has received from the control circuit 53 of the operation unit 50 notification of attachment of the operation terminal 160 to the holder 180. When the response controller unit 532 has not received the notification, the operation terminal 160 is now detached from the holder 180. Thus, the response controller unit 532 assigns default attributes to responsive sounds. Like the first spectrum of responsive vibration, the attributes are specified by firmware or an application program stored in the memory unit 165, for example, and usually vary for the different types of gadgets to be responded with sounds, or for the different types of gesture. When the response controller unit 532 has received the notification, the operation terminal 160 is now held by the holder of the MFP 100. This might cause a user to hear sounds responsive to the same operations as different ones depending on conditions of operation noises of the elements 110, 120, 130 of the image processing unit or ambient noises. Thus, the response controller unit 532 sets the attributes of responsive sounds to values different from default ones. In these attributes, the loudness level is kept at default, but the frequency is changed from a default value so that the sound pressure rises from the default value. The "loudness level" means the level of sound intensity perceived by a person. In general, audible sounds at the same loudness level but at different frequencies are different in physical sound pressure. As a result, the responsive sounds can be perceived by a user as having the same sound pressure as default ones, without being drowned out by any operation noises of the image processing unit and ambient noises.

Procedure of FFB Process by Touch Panel

Figure 8B:
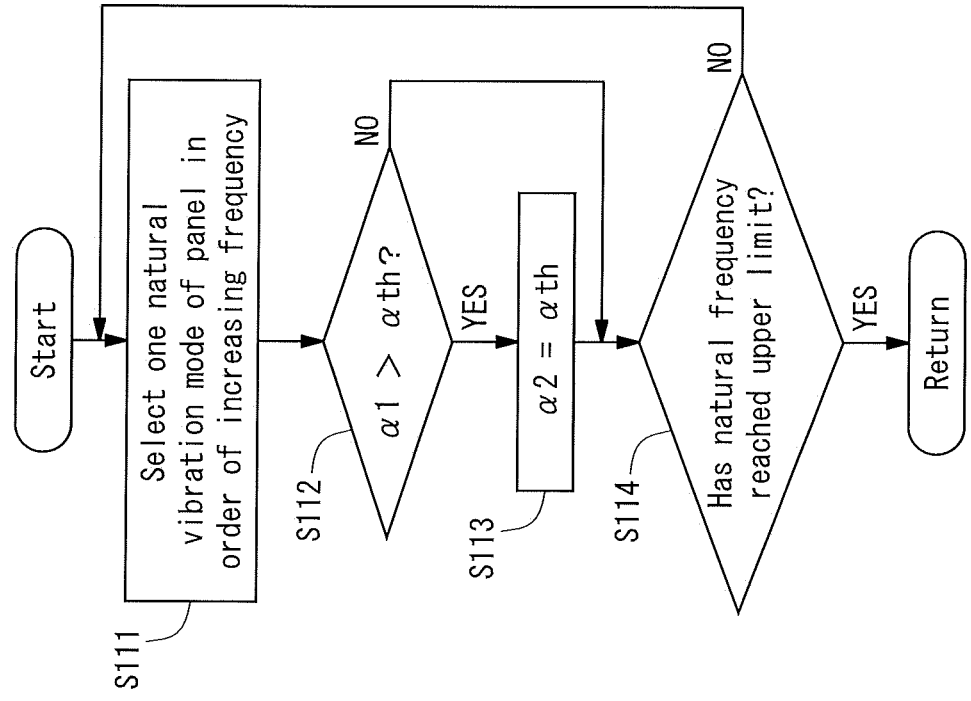
FIG. 8B is a flowchart of the subroutine for deformation of the spectrum of responsive vibration from the first to the second spectrum at step S105.
Figure 8A:
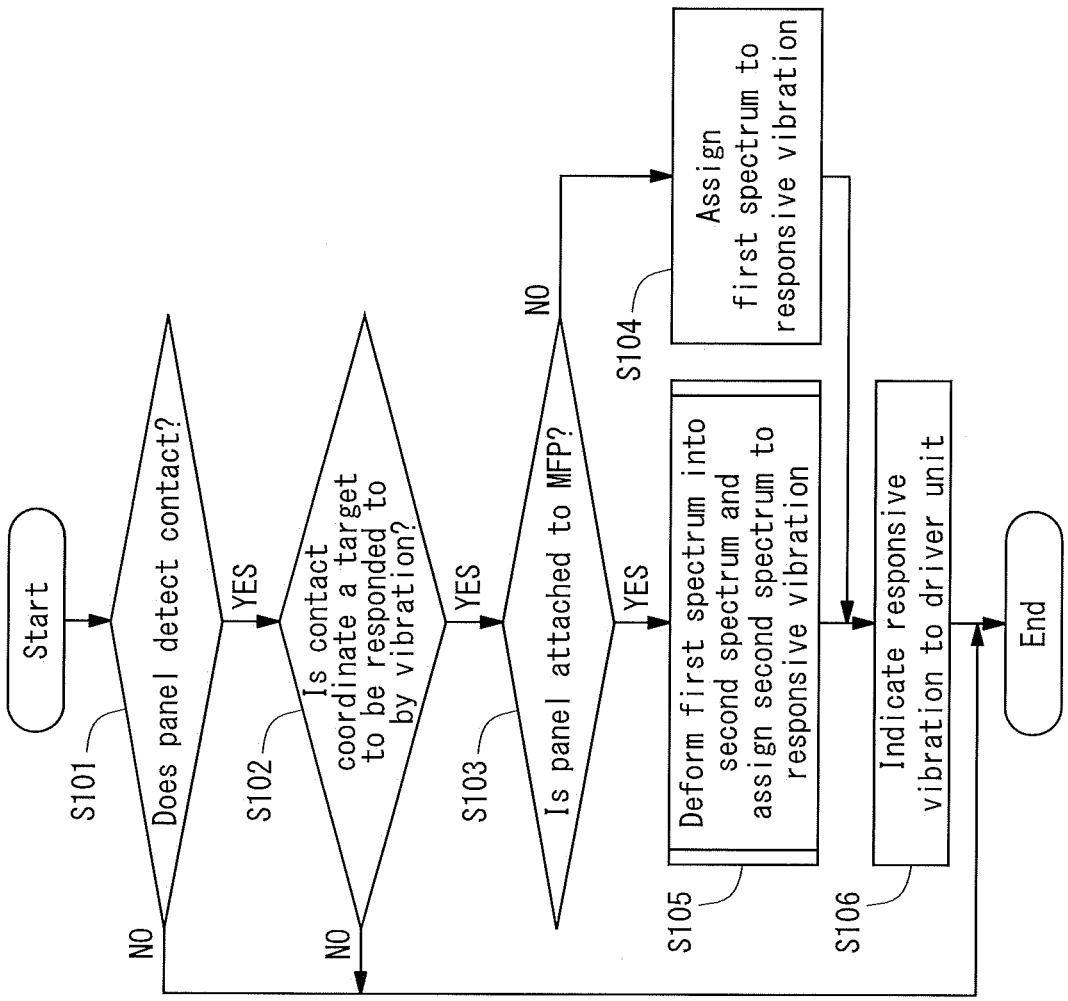
FIG. 8A is a flowchart of the FFB process by the touch panel shown in FIG. 2B.

FIG. 8A is a flowchart of the FFB process by the touch panel 170. This process starts when the display unit 167, in response to an instruction from the main controller unit 70, reproduces a GUI screen such as the operation screen on the display region on the touch panel 170, and then repeats at regular intervals during the display of the GUI screen, for example at the horizontal scanning frequency of the LCD 171, i.e. a frequency of several dozen kHz.

At step S101, the response controller unit 532 checks whether or not the touch panel 170 has detected a touch of a user's finger or the like, and more concretely, whether or not the user operation interpreter unit 531 has received the coordinates of a touch from the coordinate calculating unit 436. If received, the process proceeds to step S102, and if not, the process ends.

At step S102, the user operation interpreter unit 531 has received the coordinates of a touch from the coordinate calculating unit 436. Accordingly, the response controller unit 532 checks whether the gadget that, based on the coordinates, the user operation interpreter unit 531 has selected as a possible target for user operation, is one of the types to be responded with vibration or not. If so, the process proceeds to step S103, and if not, the process ends.

At step S103, the gadget selected as a possible target for user operation is one of the types to be responded with vibration. Thus, the response controller unit 532 checks whether or not it has received from the control circuit 53 of the operation unit 50 notification of attachment of the operation terminal 160. If not, the process proceeds to step S104, and if so, the process proceeds to step S105.

At step S104, the response controller unit 532 has not received notification of attachment of the operation terminal 160, and thus the operation terminal 160 is now detached from the holder 180. Accordingly, the response controller unit 532 assigns the first spectrum to the spectrum of responsive vibration. Then, the process proceeds to step S106.

At step S105, the response controller unit 532 has received notification of attachment of the operation terminal 160, and thus the operation terminal 160 is now held by the holder 180. Accordingly, the response controller unit 532 deforms the first spectrum into the second spectrum, and assigns the second spectrum to the spectrum of responsive vibration. Then, the process proceeds to step S106.

At step S106, the response controller unit 532 indicates, to the driver unit 410 of the vibrator unit 162, the spectrum of responsive vibration set at step S104 or S105. Then, the process ends.

FIG. 8B is a flowchart of the subroutine for deformation of the spectrum of responsive vibration from the first to the second spectrum at step S105.

At step S111, the response controller unit 532 selects one of the natural vibration modes (m, n) of the touchpad 172 in order of increasing natural frequency. Then, the process proceeds to step S112.

At step S112, the response controller unit 532 checks whether, in the first spectrum, the natural vibration mode (m, n) selected at step S111 has a level α1 exceeding the threshold value αth or not. If the level α1 exceeds the threshold value αth, the process proceeds to step S113, and if not, the process proceeds to step S114.

At step S113, the natural vibration mode (m, n) selected at step S111 has a level α1 exceeding the threshold value αth. Accordingly, the response controller unit 532 sets the level α2 of the same mode included in the second spectrum to the threshold value αth. Then, the process proceeds to step S114.

At step S114, the response controller unit 532 checks whether the natural frequency of the natural vibration mode (m, n) selected at step S111 reaches an upper limit or not. This upper limit is set within a range of levels perceivable to fingers of users. If the natural frequency does not reach the upper limit, the process repeats from step S111, and if does, the process returns to step S106 shown in FIG. 8A.

Procedure of Responsive Sound Generating Process by Touch Panel

Figure 9:
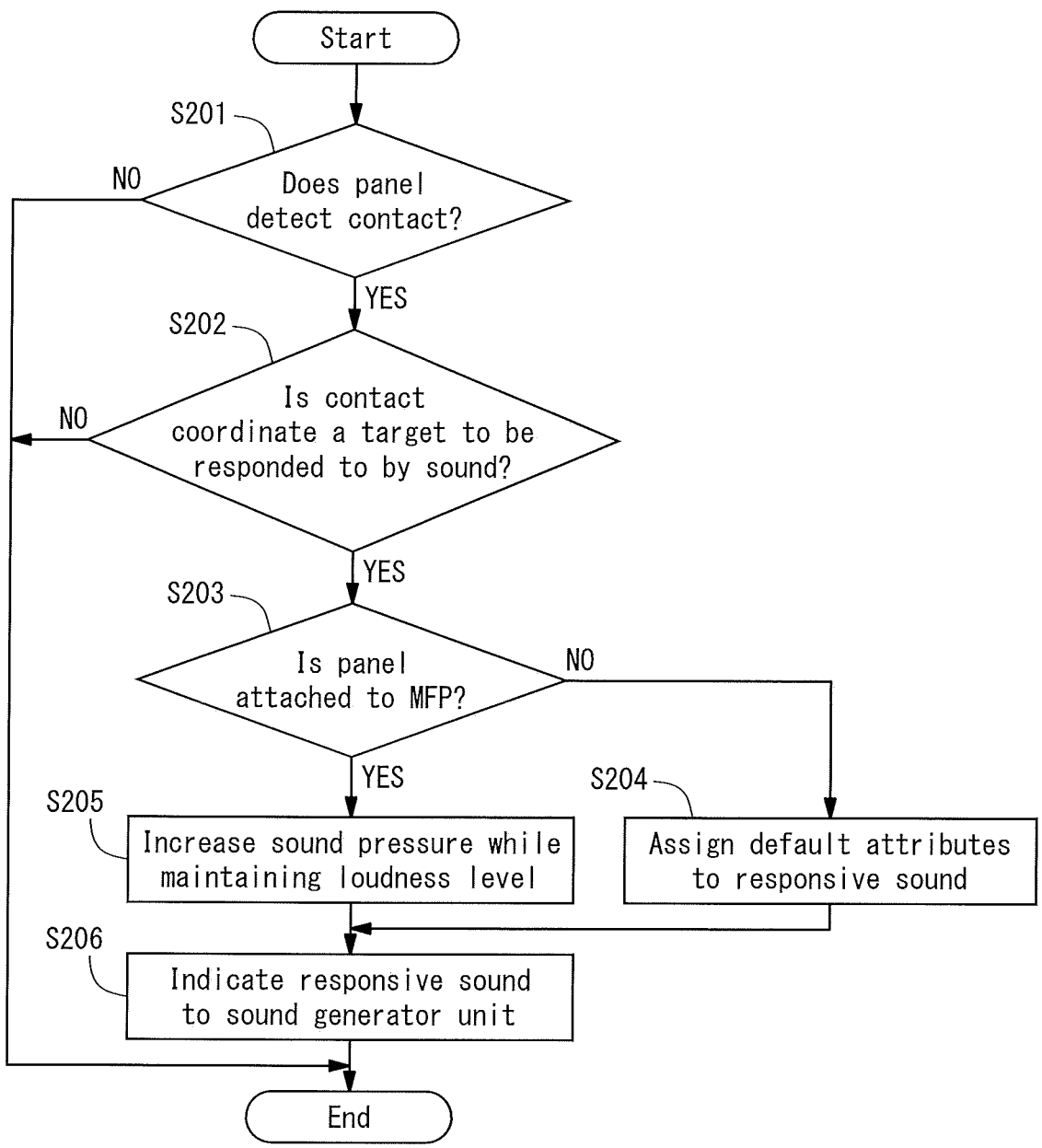
FIG. 9 is a flowchart of a process in which the touch panel shown in FIG. 2B generates responsive sound.

FIG. 9 is a flowchart of the responsive sound generating process by the touch panel 170. This process starts when the display unit 167, in response to an instruction from the main controller unit 70, reproduces a GUI screen such as the operation screen on the display region on the touch panel 170, and then repeats at regular intervals during the display of the GUI screen, for example at the horizontal scanning frequency of the LCD 171, i.e. a frequency of several dozen kHz.

At step S201, the response controller unit 532 checks whether or not the touch panel 170 has detected a touch of a user's finger or the like, more concretely, whether or not the user operation interpreter unit 531 has received the coordinates of a touch from the coordinate calculating unit 436. If received, the process proceeds to step S202, and if not, the process ends.

At step S202, the user operation interpreter unit 531 has received the coordinates of a touch from the coordinate calculating unit 436. Accordingly, the response controller unit 532 checks whether the gadget that, based on the coordinates, the user operation interpreter unit 531 has selected as a possible target for user operation, is one of the types to be responded with sounds or not. If so, the process proceeds to step S203, and if not, the process ends.

At step S203, the gadget selected as a possible target for user operation is one of the types to be responded with sounds. Thus, the response controller unit 532 checks whether or not it has received from the control circuit 53 of the operation unit 50 notification of attachment of the operation terminal 160. If not, the process proceeds to step S204, and if so, the process proceeds to step S205.

At step S204, the response controller unit 532 has not received notification of attachment of the operation terminal 160, and thus the operation terminal 160 is now detached from the holder 180. Accordingly, the response controller unit 532 sets the attributes of responsive sounds to default values. Then, the process proceeds to step S206.

At step S205, the response controller unit 532 has received notification of attachment of the operation terminal 160, and thus the operation terminal 160 is now held by the holder 180. Accordingly, the response controller unit 532 sets the attributes of responsive sounds to values different from default ones, thus raising the sound pressure from a default value with the loudness level kept at default. Then, the process proceeds to step S206.

At step S206, the response controller unit 532 indicates, to the sound generator unit 163, the attributes of responsive sounds set at step S204 or S205. Then, the process ends.

Merit of Embodiment

The MFP 100 according to the embodiment of the invention detachably holds the operation terminal 160, as described above. In the operation terminal 160, in response to the touch panel 170 sensing a touch, the response controller unit 532 indicates the spectrum of responsive vibration to the vibrator unit 162, and indicates the attributes of responsive sounds to the sound generator unit 163. When the operation terminal 160 is detached from the holder 180 at the time the touch is sensed, the spectrum of responsive vibration is set to the first spectrum, and the attributes of responsive sounds are set to default values. When the operation terminal 160 is held by the holder 180 at the time the touch is sensed, the spectrum of responsive vibration is deformed from the first spectrum to the second one. Since the natural vibration mode at a level exceeding the threshold value $\alpha$th in the first spectrum is at a level suppressed to the threshold value $\alpha$th in the second spectrum, the intensity of the responsive vibration is lowered when the operation terminal 160 is held by the holder 180 than when the terminal 160 is detached from the holder 180. Therefore, the MFP 100 enables a user to perceive the responsive vibration of the operation terminal 160 without adverse effect on its own image processing. When the operation terminal 160 is held by the holder 180 at the time the touch is sensed, the attributes of responsive sounds are changed so that the sound pressure rises from a default value while the loudness level is kept at default. Thus, the MFP 100 enables a user to perceive the responsive sounds as having the same sound pressure as the default ones, without being drowned out by any operation noises of the image processing unit and ambient noises.

Modification (A) The image processing device 100 that FIG. 1A shows is the MFP. Alternatively, an image processing device according to an embodiment of the invention may be any single-function device, e.g. a laser printer, a printer of another type such as an inkjet type, a copier, a scanner, a fax machine.

(B) The operation terminal 160 shown in FIG. 2 is specialized for the MFP 100. Alternatively, the operation terminal may be realized by an existing mobile electronic device executing a specific application program.

(C) In the operation unit 50 shown in FIG. 4, through the proximity switch 52 embedded in the holder 180, the control circuit 53 detects the operation terminal 160 held by the holder 180. Instead of the proximity switch 52, the control circuit 53 may use NFC in the detection. In this case, the control circuit 53 may detect the operation terminal 160 placed within the NFC communication range, e.g. in the order of 10 cm, from the holder 180 as the operation terminal 160 held by the holder 180. Alternatively, an operating switch, i.e. a mechanical contact switch, may be mounted at a location on the holder 180 where the operation terminal 160 should be attached, and turning off of the operating switch may be detected as the attachment of the operation terminal 160 to the holder 180. An acceleration sensor may be mounted on the holder 180, another portion of the body of the MFP 100, or its chassis, and agreement in waveform between vibration shown by output of the sensor and responsive vibration may be detected as the attachment of the operation terminal 160 to the MFP 100. Thus, not only when the operation terminal 160 is held by the holder 180, but also when it is merely placed on another portion of the body of the MFP 100, responsive vibration can suppress any adverse effect on the action of the image processing unit 110, 120, 130.

(D) The operation unit 50 may allow a user to customize responsive vibration or sounds. More concretely, the operation unit 50 may make the display unit 167 display a setting screen for parameters specifying responsive vibration or sounds as one portion of the operation screen, for example. The parameters include, e.g. the intensity and frequency of vibration, the interval of intermittent vibrations, and the pressure, frequency, and tone of sounds. Through the setting screen, the operation unit 50 accepts the user's entry of indexes representing the user's preference about responsive vibration or sounds. The indexes, which are hereinafter referred to as "preference indexes," include an increment or decrement of each level of responsive vibration or sounds, and an upper or lower limit to be set for each level, for example. The preference indexes may have values that vary depending on which of the ADF 110, the scanner 120, and the printer 130 is operating. The operation unit 50 makes the main controller unit 70 store the accepted preference indexes into the ROM 73. According to these preference indexes, the response controller unit 532 updates the first spectrum of responsive vibration or the default attributes of responsive sounds, and sets the parameters specifying responsive vibration or sounds to designated values corresponding to the preference indexes. In this case, a designated value for the level of a natural vibration mode included in responsive vibration may exceed the threshold value $\alpha$th. The response controller unit 532 may use all the designated values in the settings of responsive vibration without changing any of them when the unit 532 has not been notified of attachment of the operation terminal 160 to the holder 180 at the time the touch panel 170 has sensed a touch, or when the unit 532 has been notified of attachment but the designated values include the intensity of responsive vibration that is no higher than the threshold value $\alpha$th. On the other hand, when the response controller unit 532 has been notified of attachment of the operation terminal 160 to the holder 180 at the time the touch panel 170 has sensed a touch, and in addition, the designated values include the intensity of responsive vibration exceeding the threshold value $\alpha$th, the unit 532 may combine the designated values other than the intensity of vibration with another intensity of vibration no higher than the threshold value $\alpha$th, and uses the combination in the settings of responsive vibration at least during the operation of the image processing unit 110, 120, 130.

(E) The touch panel 170 shown in FIG. 5 is a 4-wire resistive type that supports multi-touch by using the two resistive films. The touch panel, alternatively, may be any other known type, such as a 5-wire resistive type, a multi-touch-compatible resistive type with a matrix of resistive films, an electrostatic capacitance type, or an optical type. In the structure of any of these types, the vibrator unit can apply vibration to the touchpad allowing users' fingers to touch it, or a protector member, such as a sheet, film, or panel that covers the touchpad.

(F) As FIG. 5 shows, the pair of the piezoelectric actuators 174 are used in applying vibration to the touchpad 172. Not limited to the arrangement shown in FIG. 5, a piezoelectric actuator may be arranged on every side of the touchpad 172, for example. Instead of the piezoelectric actuators, an eccentric rotating mass (ERM) motor, or a voice coil motor may be used in applying vibration to the touchpad 172.

(G) The spectra of vibration shown in FIG. 6 and FIG. 7 represent the level of vibration with the intensity of vibration a, i.e. the acceleration rate of a medium. Each spectrum may alternatively represent the level of vibration with the velocity or displacement of the medium.

(H) The threshold value αth shown in FIG. 7 is set to a different level depending on which element 110, 120, 130 of the image processing unit is operating; this level is the same among all the natural vibration modes included in the spectrum of resistive vibration. Alternatively, the threshold value αth may be fixed to a common level regardless of which element 110, 120, 130 of the image processing unit is operating, when the threshold value αth only varies within a negligible range among the elements 110, 120, 130. When an extent to which responsive vibration adversely affects the image processing unit during its operating varies with the frequency of the vibration in a non-negligible manner, the threshold value αth may be set to a different level for a different natural vibration mode. Furthermore, the threshold value αth may be set to a different level depending on the thickness, type, basis weight, or conveyance speed of a sheet to be processed. More concretely, a thinner sheet, a sheet with a slipperier surface, a lighter sheet, and a sheet moving at a lower speed are subject to a larger displacement caused by external vibration, and thus, may entail the lower level of the threshold value αth.

(I) In the FFB process shown in FIG. 8, the response controller unit 532 replaces the level α1 of any natural vibration mode in the first spectrum with the threshold value αth whenever the level α1 exceeds the threshold value αth, thus deforming the first spectrum into the second spectrum. The response controller unit 532, alternatively, may eliminate from the first spectrum every natural vibration mode of the level α1 exceeding the threshold value αth, thus deforming the first spectrum into the second spectrum. Instead of deforming the first spectrum into the second spectrum, the response controller unit 532 may stop the vibrator unit 162 at least during the operation of the image processing unit 110, 120, 130. In any of the above-mentioned manners, responsive vibration can avoid an adverse effect on the action of the image processing unit 110, 120, 130.

The response controller unit 532 may use an isosensitivity curve for user's sensation of vibration in the deformation from the first to the second spectrum. This can reduce the level of responsive vibration without causing a user to notice the difference in responsive vibration between the operation terminal 160 held by and detached from the holder 180, thus avoiding an adverse effect on the action of the image processing unit.

The "isosensitivity curve" means a curve expressing, in a vibration parameter space, a group of vibratory stimuli that have physically different vibration levels but cause a person to perceive the same level. See, for example, "Ningen-Kogaku handbook (in Japanese)," Ito Seiji, et al., Jun. 20, 2013, Asakura Shoten, p. 78, FIG. 2.70. The response controller unit 532 may select values of vibration parameters such that the level of responsive vibration changes along the same isosensitivity curve when the response controller unit 532 has been notified of detection of the operation terminal 160 held by the holder 180 at the time the touch panel 170 has sensed a touch, as when the response controller unit 532 has not been notified of the detection. In this case, reduction in the level of responsive vibration can be hardly noticeable for users.

Figure 10A:
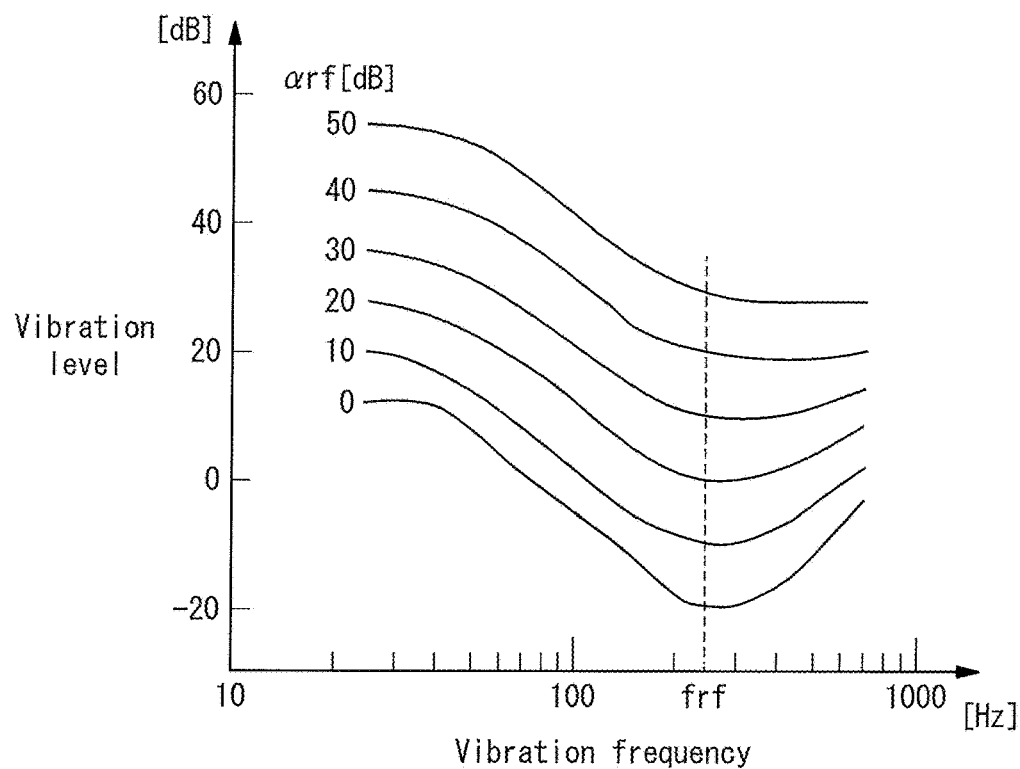
FIG. 10A is a graph showing isosensitivity curves of a human hand for vibratory stimuli.

FIG. 10A is a graph showing isosensitivity curves of a human hand for vibratory stimuli. Referring to FIG. 10A, these isosensitivity curves are drawn in a two dimensional space represented by two types of vibration parameters, "vibration levels" and "vibration frequencies." Each curve expresses a group of vibratory stimuli that subjects perceive at the same intensity level as that of the reference vibration of a constant frequency frf, e.g. 250 Hz. Different curves express different physical levels αrf of the reference vibration. Data BVS showing these curves is stored in the memory unit 165, for example. The response controller unit 532, when indicating the spectrum of responsive vibration to the vibrator unit 162, refers to the data BVS to use the curves in deformation from the first to the second spectrum.

Figure 10B:
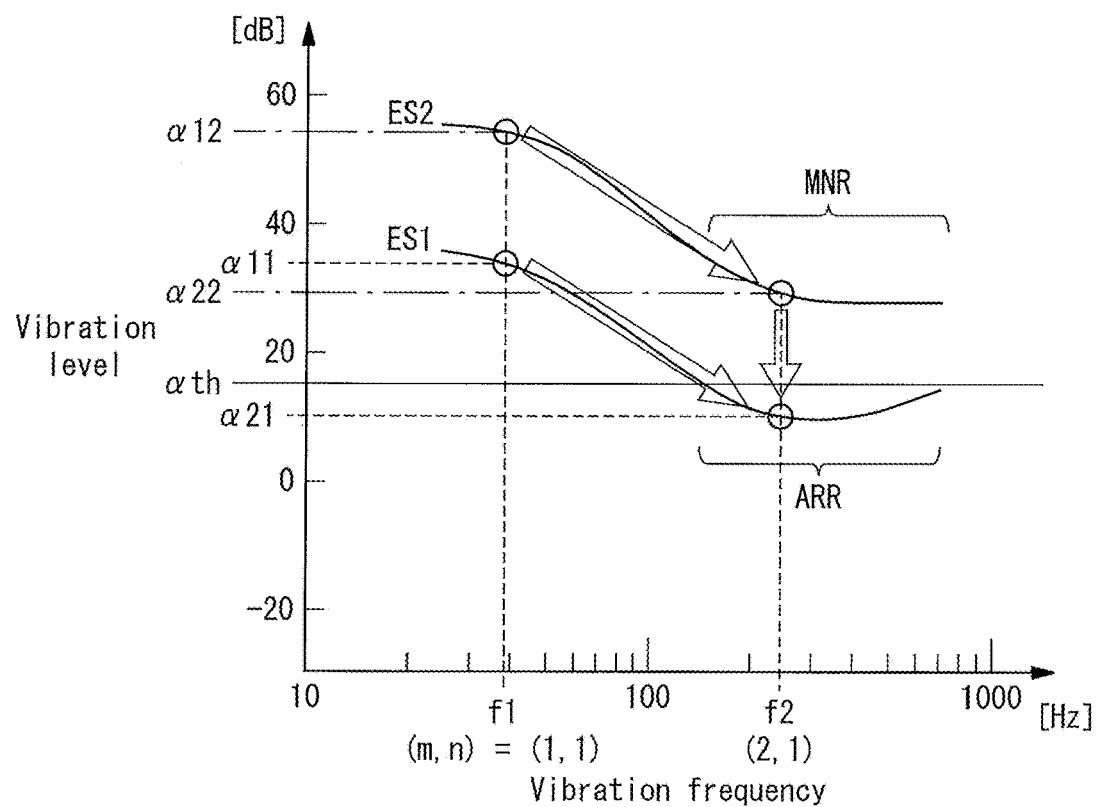
FIG. 10B is a graph showing a method of deforming the spectrum of responsive vibration by using the isosensitivity curves.

FIG. 10B is a graph showing a method of deforming the spectrum of responsive vibration by using the isosensitivity curves shown in FIG. 10A. Referring to FIG. 10B, one of the natural vibration modes in the first spectrum, (m, n)=(1, 1), has a level exceeding the threshold value αth. Accordingly, the response controller unit 532, when deforming the first spectrum into the second one, sets a mode with which the mode (m, n)=(1, 1) is to be replaced in the second spectrum as follows.

First, suppose that a portion ARR with vibration levels no higher than the threshold value αth can be found in the isosensitivity curve on which the natural frequency-vibration level pair (f1, α1) of the mode (m, n)=(1, 1) is located, like in the isosensitivity curve ES1 for the reference vibration with level αrf=30 dB, for example. In this case, the response controller unit 532 selects a natural vibration mode that has a natural frequency belonging to the frequency band of the portion ARR, e.g. the mode (m, n)=(2, 1) whose natural frequency is the lowest value f2. The response controller unit 532 sets into the second spectrum the vibration level α21 of this mode that the portion ARR shows.

Next, suppose that any portions with vibration levels no higher than the threshold value αth cannot be found in the isosensitivity curve on which the natural frequency-vibration level pair (f1, α1) of the mode (m, n)=(1, 1) is located, like in the isosensitivity curve ES2 for the reference vibration with level αrf=50 dB, for example. In this case, the response controller unit 532 first searches the isosensitivity curve ES2 for a portion MNR with the lowest vibration level to select a natural vibration mode that has a natural frequency belonging to the portion MNR, e.g. the mode (m, n)=(2, 1) whose natural frequency is the lowest value f2. Since the vibration level α22 of this mode exceeds the threshold value αth, the response controller unit 532 next searches another isosensitivity curve on which the vibration level of this mode is no higher than the threshold value αth, e.g. the isosensitivity curve ES1 for the reference vibration with level αrf=30 dB. Since, on this curve ES1, the vibration level α21 of the mode (m, n)=(2, 1) is no higher than the threshold value αth, the response controller unit 532 sets the vibration level α21 of this mode into the second spectrum.

Figure 11:
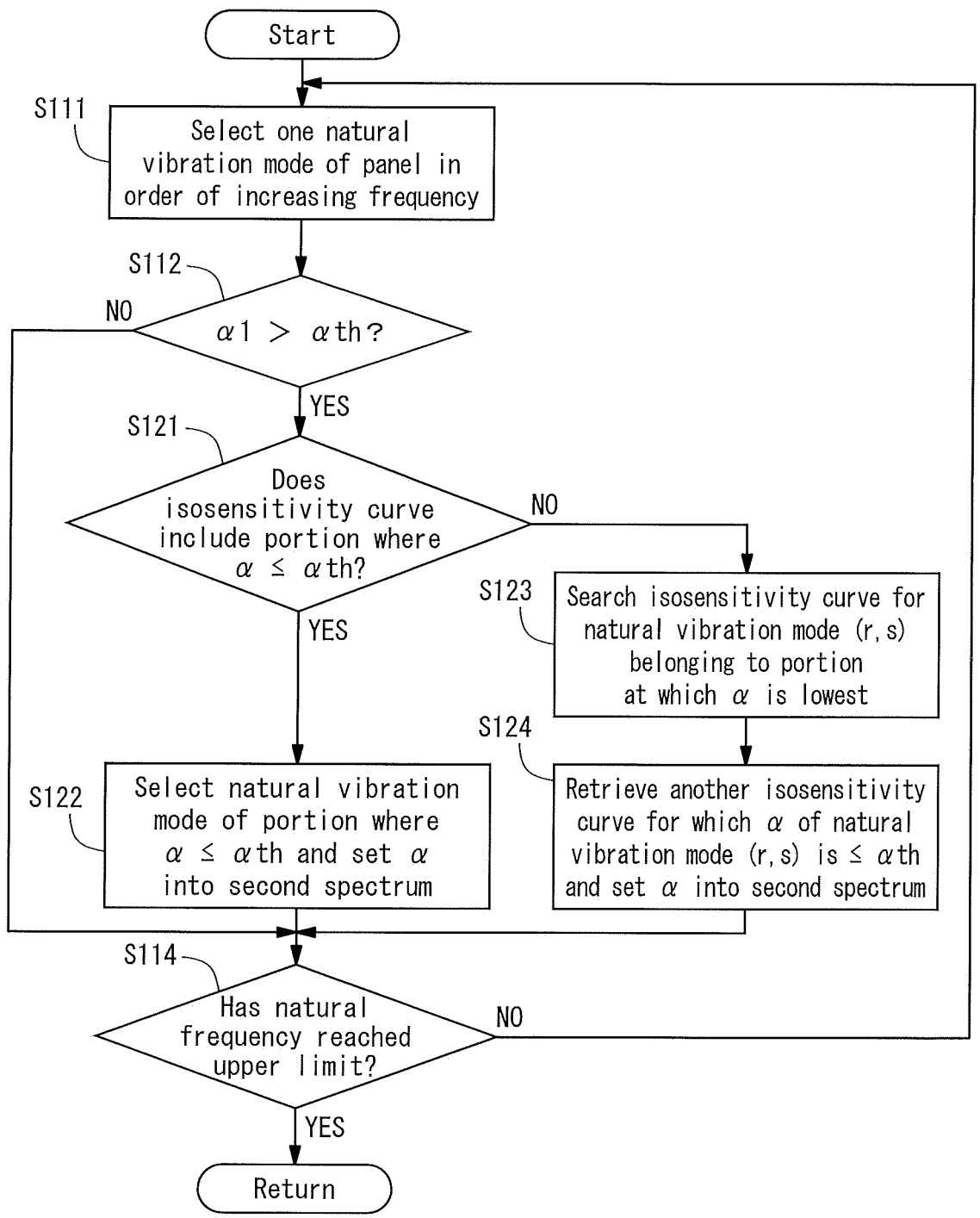
FIG. 11 is a flowchart of the subroutine for deformation of the spectrum of responsive vibration at step S105 that FIG. 8A shows.

FIG. 11 is a flowchart of the subroutine for using isosensitivity curves in the deformation of the spectrum of responsive vibration at step S105 shown in FIG. 8A. Referring to FIG. 11, this process includes steps similar to those of the process shown in FIG. 8B except for steps S121-S124 with which step S113 is replaced. These similar steps are marked with the same reference symbols as those shown in FIG. 8B.

At step S111, the response controller unit 532 selects one of the natural vibration modes (m, n) of the touchpad 172 in order of increasing natural frequency. Then, the process proceeds to step S112.

At step S112, the response controller unit 532 checks whether, in the first spectrum, the natural vibration mode (m, n) selected at step S111 has a level α1 exceeding the threshold value αth or not. If the level α1 exceeds the threshold value αth, the process proceeds to step S121, and if not, the process proceeds to step S114.

At step S121, the natural vibration mode (m, n) selected at step S111 has a level α1=α11 or α12 exceeding the threshold value αth. Accordingly, the response controller unit 532 retrieves from the data BVS the isosensitivity curve ES1 or ES2 on which the natural frequency-vibration level pair (f1, α11) or (f1, α12) of the mode (m, n) is located, and searches the isosensitivity curve ES1 or ES2 for a portion with vibration levels no higher than the threshold value αth. If the portion is found, the process proceeds to step S122, and if not, the process proceeds to step S123.

At step S122, the portion ARR can be found in the isosensitivity curve ES1 retrieved at step S121, which has vibration levels no higher than the threshold value αth. The response controller unit 532 selects a natural vibration mode (p, q) that has a natural frequency belonging to the frequency band of the portion ARR, and then sets into the second spectrum the vibration level α2 of this mode (p, q) that the portion ARR shows. Then, the process proceeds to step S114.

At step S123, only portions with vibration levels higher than the threshold value αth can be found in the isosensitivity curve ES2 retrieved at step S121. The response controller unit 532 searches the isosensitivity curve ES2 for a portion MNR with the lowest vibration level to select a natural vibration mode that has a natural frequency belonging to the portion MNR, e.g. the mode (r, s) whose natural frequency is the lowest value f2. Then, the process proceeds to step S124.

At step S124, the response controller unit 532 retrieves another isosensitivity curve ES1 on which the vibration level of the mode (r, s) selected at step S123 is no higher than the threshold value αth, and then sets the vibration level α2 of this mode (r, s) into the second spectrum. Then, the process proceeds to step S114.

At step S114, the response controller unit 532 checks whether the natural frequency of the natural vibration mode (m, n) selected at step S111 reaches an upper limit or not. If the natural frequency does not reach the upper limit, the process repeats from step S111, and if it does, the process returns to step S106 shown in FIG. 8A.

As described above, when the natural vibration mode (m, n) included in the first spectrum has a level α1 exceeding the threshold value αth, the response controller unit 532 searches the isosensitivity curve on which the natural frequency-vibration level pair of the mode (m, n) is located, for a portion with vibration levels no higher than the threshold value αth. If such a portion ARR is found on the isosensitivity curve ES1, the response controller unit 532 selects a natural vibration mode (p, q) from the portion ARR, and then sets the vibration level α2 of this mode (p, q) into the second spectrum. This results in the levels α1 and α2 of responsive vibration changing along the same isosensitivity curve ES1 both in the first and second spectra. Thus, the MFP 100 enables responsive vibration to keep the same psychological intensity for users but reduce the physical intensity to a level that provides no adverse effect on the image processing of the MFP 100.

Even if failing to find any portion with vibration levels no higher than the threshold value αth in the isosensitivity curve ES2, the response controller unit 532 selects a natural vibration mode (r, s) from a portion MNR with the lowest vibration level of the isosensitivity curve ES2, and from another isosensitivity curve ES1 on which the vibration level α2 of this mode (r, s) is no higher than the threshold value αth, sets the vibration level α2 into the second spectrum. This results in minimizing the difference in psychological intensity between the mode (m, n) in the first spectrum with the vibration level α1 exceeding the threshold value αth, and the replacement mode (r, s) in the second spectrum with the vibration level α2 no higher than the threshold value αth. Thus, the MFP 100 makes users hardly notice the reduction in the physical intensity of responsive vibration to a level that provides no adverse effect on the image processing of the MFP 100.

In the response process shown in FIG. 8 and FIG. 9, the response controller unit 532 changes the spectra of responsive vibration and the attributes of responsive sounds depending on whether the operation terminal 160 is held by or detached from the holder 180. The response controller unit 532 may further change the spectra of responsive vibration and the attributes of responsive sounds depending on whether the image processing unit 110, 120, 130 is operating or waiting while the operation terminal 160 is held by the holder 180. Thus, the response controller unit 532 can minimize both the time to keep the physical intensity of responsive vibration at a lower level that provides no adverse effect on the image processing of the MFP 100, and the time to keep the physical sound pressure of responsive sounds at a higher level that is not drowned out by operation noises of the image processing unit 110, 120, 130.

Figure 12:
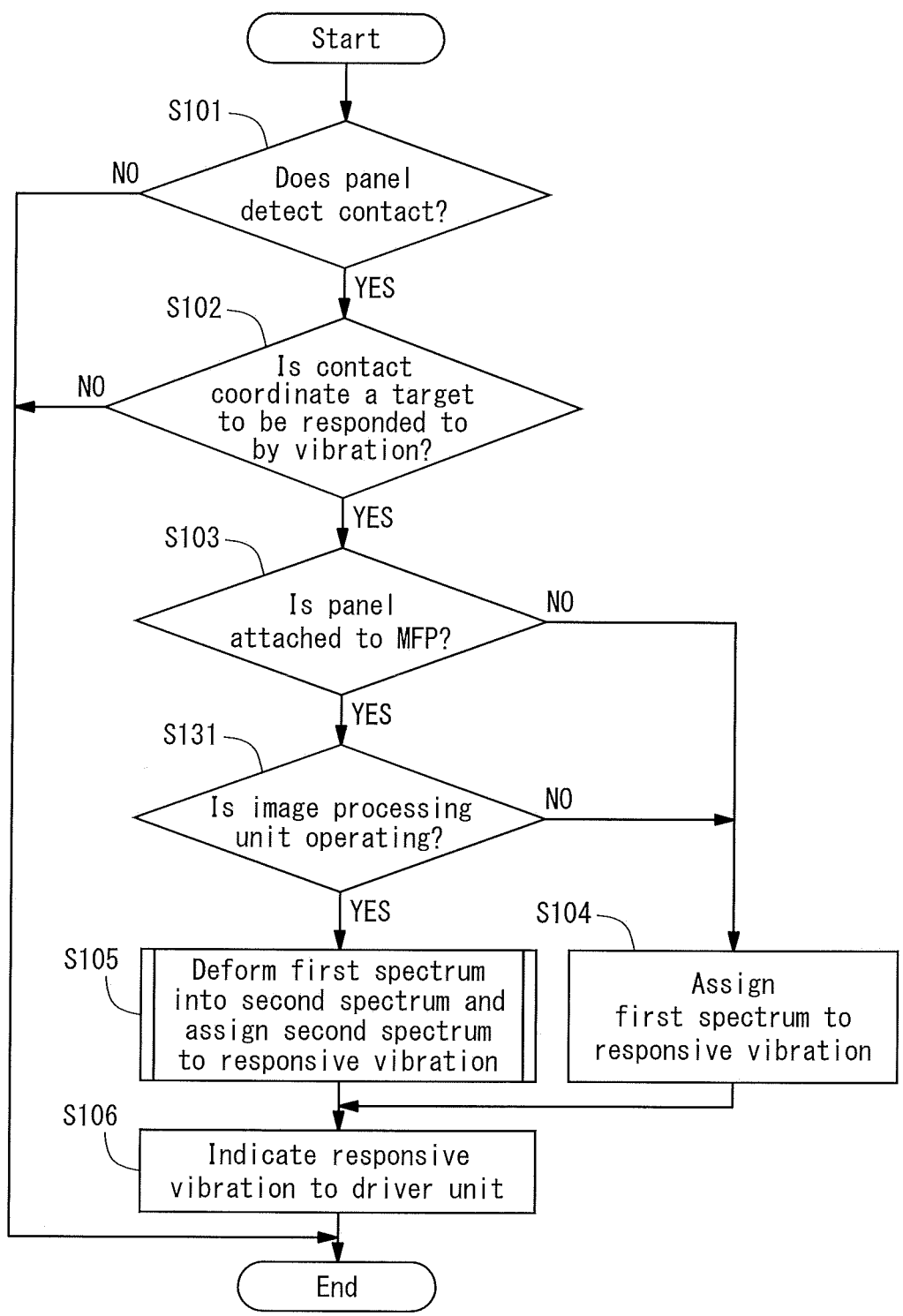
FIG. 12 is a flowchart of a modification of the FFB process by the touch panel shown in FIG. 2B.

FIG. 12 is a flowchart of a modification of the FFB process by the touch panel 170. Referring to FIG. 12, this process includes steps similar to those of the process shown in FIG. 8A except for step S131 added between steps S103 and S105. These similar steps are marked with the same reference symbols as those shown in FIG. 8A.

At step S101, the response controller unit 532 checks whether or not the touch panel 170 has detected a touch of a user's finger or the like. If detected, the process proceeds to step S102, and if not, the process ends.

At step S102, the user operation interpreter unit 531 has received the coordinates of a touch from the coordinate calculating unit 436. Accordingly, the response controller unit 532 checks whether the gadget that, based on the coordinates, the user operation interpreter unit 531 has selected as a possible target for user operation, is one of the types to be responded with vibration or not. If so, the process proceeds to step S103, and if not, the process ends.

At step S103, the gadget selected as a possible target for user operation is one of the types to be responded with vibration. Thus, the response controller unit 532 checks whether or not it has received from the control circuit 53 of the operation unit 50 notification of attachment of the operation terminal 160. If not, the process proceeds to step S104, and if so, the process proceeds to step S131.

At step S131, the response controller unit 532 has received notification of attachment of the operation terminal 160, and thus the operation terminal 160 is now held by the holder 180. Accordingly, the response controller unit 532 refers to the main controller unit 70 for whether all the elements 110, 120, 130 of the image processing unit are under the waiting condition, or at least one of them is under the operating condition. If all the elements are waiting, the process proceeds to step S104, and if one of them is operating, the process proceeds to step S105.

At step S104, either of the following two conditions will be satisfied: (1) The response controller unit 532 has not received notification of attachment of the operation terminal 160, and thus the operation terminal 160 is now detached from the holder 180; (2) The response controller unit 532 has received the notification, and thus the operation terminal 160 is now held by the holder 180, but all the elements 110, 120, 130 of the image processing unit are now waiting. Accordingly, under any of the conditions, the response controller unit 532 assigns the first spectrum to the spectrum of responsive vibration. Then, the process proceeds to step S106.

At step S105, the response controller unit 532 has received notification of attachment of the operation terminal 160, and thus the operation terminal 160 is now held by the holder 180, and in addition, one of the elements 110, 120, 130 of the image processing unit is now operating. Since responsive vibration at a level exceeding the threshold value $\alpha$th could adversely affect on the image processing, the response controller unit 532 deforms the first spectrum into the second spectrum, and assigns the second spectrum to the spectrum of responsive vibration. Then, the process proceeds to step S106.

At step S106, the response controller unit 532 indicates, to the driver unit 410 of the vibrator unit 162, the spectrum of responsive vibration set at step S104 or S105. Then, the process ends.

The process of generating responsive sounds may also include a step similar to step S131 between steps S203 and S205 shown in FIG. 10.

The operation terminal 160 shown in FIG. 5 expresses the signal responsive to a touch on the touch panel 170 with vibration or sounds. A responsive signal may be generated in another form perceivable to a user, such as light. For example, in response to detection of a touch by the touch panel 170, the operation terminal 160 may make the display unit 167 not only change the appearance of a gadget displayed on the LCD 171, but also alter the pattern of change in the appearance depending on whether or not it has received notification of attachment of the operation terminal 160 to the holder 180. Since the position of the operation terminal 160 relative to a user is generally different between when it is held by the holder 180 and when it is detached from the holder 180, altered patterns of change in the appearance of the gadget can facilitate the user's visual awareness of the change.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

Supplement

Based on the above-described embodiment, the invention may be further characterized as follows.

The signal generator unit may include a vibrator unit configured to apply vibration to the display region. In this case, the response controller unit may instruct the vibrator unit to apply a responsive vibration to the display region as the signal responsive to the object, and when the operation terminal is held by the holder at the time the touch panel senses the object, the response controller unit may set the responsive vibration to a level lower than when the operation terminal is detached from the holder, at least during the operating of the image processing unit.

A threshold value may be set to a level of vibration that the vibrator unit applies to the display region. The level of vibration causes no more than an acceptable negative effect on the operation of the image processing unit while the operation terminal is held by the holder. The response controller unit may set the responsive vibration to a level no higher than the threshold value at least during the operating of the image processing unit if the operation terminal is held by the holder at the time the touch panel senses the object. The image processing device may further include a vibration detector unit configured to detect vibration occurring in the housing. If the vibration detector unit detects the responsive vibration that the vibrator unit applies, the response controller unit may set the responsive vibration to a level no higher than the threshold value at least during the operating of the image processing unit. Alternatively, the operation screen may include a setting screen for at least one of vibration parameters specifying the responsive vibration. The response controller unit may set one of the vibration parameters that should be used if the operation terminal is detached from the holder at the time the touch panel senses the object to a designated value indicated by user operation on the setting screen. When the designated value is a level of vibration no higher than the threshold value, the response controller unit may set one of the vibration parameters that should be used if the operation terminal is held by the holder at the time the touch panel senses the object to the designated value. When the designated value is a level of vibration exceeding the threshold value, the response controller unit may set one of the vibration parameters that should be used if the operation terminal is held by the holder at the time the touch panel senses the object to another level of vibration no higher than the threshold value, at least during the operating of the image processing unit.

The image processing device may further include a storage unit storing therein data representing isosensitivity curves for user's sensation of vibration. The curves are drawn in a space of the vibration parameters specifying the responsive vibration. The response controller unit may use the data to select values of the vibration parameters such that a point showing the level of the responsive vibration is plotted on the same isosensitivity curve both when the operation terminal is held by the holder and when the operation terminal is detached from the holder. A threshold value may be set to a level of vibration that the vibrator unit applies to the display region. The level of vibration causes no more than an acceptable negative effect on the operation of the image processing unit while the operation terminal is held by the holder. If the operation terminal is held by the holder at the time the touch panel senses the object, the response controller unit may search the isosensitivity curve for a portion showing a level of vibration no higher than the threshold value. If finding the portion, the response controller unit may select, within the range of the vibration parameters specifying the portion, values of the vibration parameters specifying the responsive vibration, at least during the operating of the image processing unit. If failing to find the portion showing a level of vibration no higher than the threshold value, the response controller unit may search the isosensitivity curve for another portion showing the lowest level of vibration, and may combine values of the vibration parameters specifying the other portion, other than the lowest level of vibration, with another level of vibration no higher than the threshold value, and may provide the combination to the vibrator unit. The operation screen may include a setting screen for vibration parameters specifying the responsive vibration. The response controller unit may set a value of one of the vibration parameters that should be used if the operation terminal is detached from the holder at the time the touch panel senses the object to a designated value indicated by user operation on the setting screen. When the designated value is a level of vibration no higher than the threshold value, the response controller unit may set a value of one of the vibration parameters that should be used if the operation terminal is held by the holder at the time the touch panel senses the object to the designated value. When the designated value is a level of vibration exceeding the threshold value, the response controller unit may search an isosensitivity curve to which the designated value belongs for a portion showing a level of vibration no higher than the threshold value.

After the response controller unit provides the vibrator unit with a value of one of the vibration parameters different from the designated value and the image processing unit returns to a waiting condition, the response controller unit may reset the value of the vibration parameters to the designated value when sending the first instruction for the responsive vibration to the vibrator unit. The image processing unit may include a scanner unit configured to capture an image from a sheet and an image forming unit configured to print an image onto a sheet. The threshold value may vary depending on whether the scanner or the image forming unit is operating. The image processing unit, while conveying a sheet, may capture an image from the sheet and/or print an image onto the sheet. The threshold value may vary depending on types and conveyance speeds of the sheet. The vibration parameters may include, in addition to a level of vibration, at least one of frequency of vibration and interval of intermittent vibrations.

The response controller unit may stop the vibrator unit at least during the operating of the image processing unit if the operation terminal is held by the holder at the time the touch panel senses the touch. The response controller unit may maintain the responsive vibration at a predetermined level if the operation terminal is detached from the holder at the time the touch panel senses the object.

The signal generator unit may include a sound generator unit configured to produce an audible sound. The response controller unit may instruct the sound generator unit to produce a responsive sound as the signal responsive to the object, and when the operation terminal is held by the holder at the time the touch panel senses the object, the response controller unit may, while keeping the loudness level of the responsive sound constant, raise the acoustic pressure of the responsive sound to a level higher than when the operation terminal is detached from the holder, at least during the operating of the image processing unit.

An operation terminal according to one aspect of the invention includes: a body portable and detachable from an image processing device configured to capture an image from a sheet and/or print an image on a sheet; an operation unit configured to display an operation screen for the image processing device to accept user operation on the operation screen; a transmitter unit configured to wirelessly transmit information about the user operation to the image processing device; a touch panel having a display region for the operation screen and configured to sense an external object touching the display region; a signal generator unit configured to generate a signal perceivable to a user; and a response controller unit configured to, in response to the touch panel sensing the object, check whether the operation terminal is held by or detached from the image processing device at the time the touch panel senses the object, and instruct the signal generator unit to generate the signal responsive to the object in a form that varies depending on whether the operation terminal is held by or detached from the holder.

A non-transitory recording medium according to one aspect of the invention stores therein a program to be executed by a computer built into an operation terminal. The operation terminal includes: a body portable and detachable from an image processing device configured to capture an image from a sheet and/or print an image on a sheet; an operation unit configured to display an operation screen for the image processing device to accept user operation on the operation screen; and a transmitter unit configured to wirelessly transmit information about the user operation to the image processing device. The program causes the computer to: instruct a touch panel that has a display region for the operation screen to sense an outer object touching the display region; and in response to the touch panel sensing the object, generate a signal responsive to the object in a manner perceivable to a user. Generating the signal includes: checking whether the operation terminal is held by or detached from the image processing device at the time the touch panel senses the object; and changing the responsive signal into a form that varies depending on whether the operation terminal is held by or detached from the holder.

Generating the responsive signal may further include: applying a responsive vibration to the display region of the operation screen as the signal responsive to the object; and when the operation terminal is held by the holder at the time the touch panel senses the object, setting the responsive vibration to a level lower than when the operation terminal is detached from the holder, at least during the operating of the image processing unit.

What is claimed is:

1. An image processing device comprising:
   an image processing unit configured to capture an image from a sheet and/or print an image on a sheet;
   an operation terminal configured to be portable, display an operation screen for the image processing unit to accept a user operation on the operation screen, and wirelessly transmit information about the user operation;
   a first hardware processor configured to wirelessly receive the information about the user operation from the operation terminal, and control the image processing unit according to the information;
   a housing supporting the image processing unit and the first hardware processor inside itself, and including a holder that detachably holds the operation terminal; and
   the first hardware processor being configured to discriminate between the presence and absence of the operation terminal held by the holder,
   the operation terminal including:
   a touch panel having a display region for the operation screen and configured to sense an external object touching the display region;
   a second hardware processor configured to cause the generation of a signal perceivable to a user; and
   the second hardware processor being configured to, in response to the touch panel sensing the object, cause generation of the signal responsive to the object in a first form when the operation terminal is not held by the holder and a second form when the operation terminal is held by the holder, the second form providing a lower level of responsive signal than the first form to reduce image distortion by the image processing unit when the operation terminal is held by the holder.

2. The image processing device according to claim 1, wherein
   the operation terminal includes a vibrator unit configured to apply vibration to the display region; and
   the second hardware processor is configured to cause the vibrator unit to apply a responsive vibration to the display region as the signal responsive to the object, and when the operation terminal is held by the holder at the time the touch panel senses the object, the second hardware processor sets the responsive vibration to the second form, at least during the operating of the image processing unit.

3. The image processing device according to claim 2, wherein
a threshold value is set to a level of vibration applied by the vibrator unit to the display region that causes no more than an acceptable negative effect on the operation of the image processing unit while the operation terminal is held by the holder, and
the second hardware processor sets the responsive vibration to a level no higher than the threshold value, at least during the operating of the image processing unit, if the operation terminal is held by the holder at the time the touch panel senses the object.

4. The image processing device according to claim 3, wherein
the first hardware processor is configured to detect vibration occurring in the housing, wherein
if the first hardware processor detects the responsive vibration that the vibrator unit applies, the second hardware processor sets the responsive vibration to a level no higher than the threshold value at least during the operating of the image processing unit.

5. The image processing device according to claim 3, wherein
the operation screen includes a setting screen for at least one of vibration parameters specifying the responsive vibration,
the second hardware processor sets one of the vibration parameter that should be used if the operation terminal is detached from the holder at the time the touch panel senses the object to a designated value indicated by user operation on the setting screen, and
when the designated value is a level of vibration no higher than the threshold value, the second hardware processor sets one of the vibration parameters that should be used if the operation terminal is held by the holder at the time the touch panel senses the object to the designated value, and
when the designated value is a level of vibration exceeding the threshold value, the second hardware processor sets one of the vibration parameters that should be used if the operation terminal is held by the holder at the time the touch panel senses the object to another level of vibration no higher than the threshold value, at least during the operating of the image processing unit.

6. The image processing device according to claim 5, wherein, after the second hardware processor provides the vibrator unit with a value of one of the vibration parameters different from the designated value and the image processing unit returns to a waiting condition, the second hardware processor resets the value of the vibration parameters to the designated value when sending the first instruction for the responsive vibration to the vibrator unit.

7. The image processing device according to claim 2, further comprising
a storage unit storing therein data representing isosensitivity curves for user's sensation of vibration, the curves being drawn in a space of the vibration parameters specifying the responsive vibration, wherein
the second hardware processor uses the data to select values of the vibration parameters such that a point showing the level of the responsive vibration is plotted on the same isosensitivity curve both when the operation terminal is held by the holder and when the operation terminal is detached from the holder.

8. The image processing device according to claim 7, wherein
a threshold value is set to a level of vibration applied by the vibrator unit to the display region that causes no more than an acceptable negative effect on the operation of the image processing unit while the operation terminal is held by the holder,
if the operation terminal is held by the holder at the time the touch panel senses the object, the second hardware processor searches the isosensitivity curve for a portion showing a level of vibration no higher than the threshold value, and
if finding the portion, the second hardware processor selects, within the range of the vibration parameters specifying the portion, values of the vibration parameters specifying the responsive vibration, at least during the operating of the image processing unit.

9. The image processing device according to claim 8, wherein
the second hardware processor, if failing to find the portion showing a level of vibration no higher than the threshold value, searches the isosensitivity curve for another portion showing the lowest level of vibration, and
the second hardware processor combines values of the vibration parameters specifying the other portion, other than the lowest level of vibration, with another level of vibration no higher than the threshold value, and provides the combination to the vibrator unit.

10. The image processing device according to claim 7, wherein
the operation screen includes a setting screen for vibration parameters specifying the responsive vibration,
the second hardware processor sets a value of one of the vibration parameters that should be used if the operation terminal is detached from the holder at the time the touch panel senses the object to a designated value indicated by user operation on the setting screen,
when the designated value is a level of vibration no higher than the threshold value, the second hardware processor sets a value of one of the vibration parameters that should be used if the operation terminal is held by the holder at the time the touch panel senses the object to the designated value, and
when the designated value is a level of vibration exceeding the threshold value, the second hardware processor searches an isosensitivity curve to which the designated value belongs for a portion showing a level of vibration no higher than the threshold value.

11. The image processing device according to claim 3, wherein
the image processing unit includes:
a scanner unit configured to capture an image from a sheet; and
an image former configured to print an image onto a sheet, and
the threshold value varies depending on whether the scanner or the image former is operating.

12. The image processing device according to claim 3, wherein
the image processing unit, while conveying a sheet, captures an image from the sheet and/or prints an image onto the sheet; and
the threshold value varies depending on types and conveyance speeds of the sheet.

13. The image processing device according to claim 3, wherein the vibration parameters include, in addition to a level of vibration, at least one of frequency of vibration and interval of intermittent vibrations.

14. The image processing device according claim 2, wherein the second hardware processor stops the vibrator unit at least during the operating of the image processing unit, if the operation terminal is held by the holder at the time the touch panel senses the touch.

15. The image processing device according claim 2, wherein the second hardware processor maintains the responsive vibration at a predetermined level if the operation terminal is detached from the holder at the time the touch panel senses the object.

16. The image processing device according to claim 1, wherein
the second hardware processor is configured to cause a sound generator unit to produce an audible sound; and
the second hardware processor instructs the sound generator unit to produce a responsive sound as the signal responsive to the object, and
when the operation terminal is held by the holder at the time the touch panel senses the object, the second hardware processor, while keeping the loudness level of the responsive sound constant, raises the acoustic pressure of the responsive sound to the second form, at least during the operating of the image processing unit.

17. An operation terminal comprising:
a body portable and detachable from an image processing device configured to capture an image from a sheet and/or print an image on a sheet;
an operation unit configured to display an operation screen for the image processing device to accept user operation on the operation screen;
a transmitter unit configured to wirelessly transmit information about the user operation to the image processing device;
a touch panel having a display region for the operation screen and configured to sense an outer object touching the display region;
a second hardware processor configured to cause generation of a signal perceivable to a user; and
the second hardware processor being configured to, in response to the touch panel sensing the object, check whether the operation terminal is held by or detached from the image processing device at the time the touch panel senses the object, and cause the generation of the signal responsive to the object in a first form when the operation terminal is detached from the image processing device and a second form when the operation terminal is held by the image processing device, the second form providing a lower level of responsive signal than the first form to reduce image distortion by the image processing device when the operation terminal is held by the image processing device.

18. A non-transitory recording medium storing therein a program to be executed by a computer built into an operation terminal,
the operation terminal comprising:
a body portable and detachable from an image processing device configured to capture an image from a sheet and/or print an image on a sheet;
an operation unit configured to display an operation screen for the image processing device to accept user operation on the operation screen; and
a transmitter unit configured to wirelessly transmit information about the user operation to the image processing device,
the program causing the computer to:
instruct a touch panel that has a display region for the operation screen to sense an outer object touching the display region; and
in response to the touch panel sensing the object, generate a signal responsive to the object in a manner perceivable to a user, generating the signal including:
checking whether the operation terminal is held by or detached from the image processing device at the time the touch panel senses the object; and
changing the responsive signal into a first form when the operation terminal detached from the image processing device and a second form when the operation terminal is held by the image processing device, the second form providing a lower level of responsive signal than the first form to reduce image distortion by the image processing device when the operation terminal is held by the image processing device.

19. The non-transitory recording medium according to claim 18, wherein
generating the responsive signal further includes:
applying a responsive vibration to the display region of the operation screen as the signal responsive to the object; and
when the operation terminal is held by the holder at the time the touch panel senses the object, setting the responsive vibration to the second form, at least during the operating of the image processing unit.

* * * * *